United States Patent
Allen et al.

(10) Patent No.: US 8,181,533 B2
(45) Date of Patent: *May 22, 2012

(54) ULTRASONIC FLOW METER AND TRANSDUCER ASSEMBLY WITH ISOLATED TRANSFORMER CAPSULE

(75) Inventors: Charles R. Allen, Houston, TX (US); Henry C. Straub, Jr., Sugar Land, TX (US)

(73) Assignee: Daniel Measurement and Control, Inc., Houston, TX (US)

( * ) Notice: Subject to any disclaimer, the term of this patent is extended or adjusted under 35 U.S.C. 154(b) by 319 days.

This patent is subject to a terminal disclaimer.

(21) Appl. No.: 12/683,036

(22) Filed: Jan. 6, 2010

(65) Prior Publication Data
US 2011/0162460 A1 Jul. 7, 2011

(51) Int. Cl.
G01F 1/20 (2006.01)
G01F 1/66 (2006.01)
(52) U.S. Cl. .................................. 73/861.18; 73/861.27
(58) Field of Classification Search .................. None
See application file for complete search history.

(56) References Cited

U.S. PATENT DOCUMENTS

| | | | |
|---|---|---|---|
| 4,308,754 A | 1/1982 | Pedersen et al. | |
| 7,397,168 B2 | 7/2008 | Straub, Jr. et al. | |
| 7,628,081 B1 | 12/2009 | Feller | |
| 2011/0162460 A1* | 7/2011 | Allen et al. | 73/861.18 |
| 2011/0162461 A1* | 7/2011 | Allen | 73/861.18 |
| 2011/0162462 A1* | 7/2011 | Allen | 73/861.18 |

FOREIGN PATENT DOCUMENTS
GB 2203546 A 10/1988

OTHER PUBLICATIONS

PCT/US2011/020106 Search Report and Written Opinion dated Aug. 18, 2011.
International Application No. PCT/US2011/020289 Search Report and Written Opinion dated Aug. 18, 2011.

* cited by examiner

Primary Examiner — Harshad Patel
(74) Attorney, Agent, or Firm — Conley Rose, P.C.

(57) ABSTRACT

In an embodiment, an ultrasonic flow meter comprises a spool piece including a throughbore and a transducer port extending from the outer surface of the spool piece to the throughbore. In addition, the ultrasonic flow meter comprises a transducer assembly disposed in the transducer port. The transducer assembly has a central axis and comprises a transducer holder having a first end proximal the throughbore of the spool piece, and a second end distal the throughbore of the spool piece. Further, the transducer assembly comprises a piezoelectric capsule including a piezoelectric element. The piezoelectric capsule is coupled to the transducer holder and extends generally axially from the first end of the transducer holder. Still further, the transducer assembly comprises a transformer capsule including a transformer. The transformer capsule is coupled to the transducer holder and is axially spaced apart from the piezoelectric capsule.

26 Claims, 20 Drawing Sheets

ULTRASONIC FLOW METER AND TRANSDUCER ASSEMBLY WITH ISOLATED TRANSFORMER CAPSULE

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

The various embodiments relate to ultrasonic flow meters and particularly to transducer assemblies used in ultrasonic flow meters.

After hydrocarbons have been removed from the ground, the fluid stream (either in a liquid phase or a gaseous phase) is transported from place to place via pipelines. It is desirable to know with accuracy the amount of fluid flowing in the stream, and particular accuracy is demanded when the fluid is changing hands, or during "custody transfer." Even where custody transfer is not taking place, however, measurement accuracy is desirable, and in these situations ultrasonic flow meters may be used.

An ultrasonic flow meter includes two or more transducer assemblies, each secured inside of a port in the body, or spool piece, of the flow meter. To contain the transported fluid within the flow meter, an end connector is secured over the exterior end of each transducer port in the spool piece. Thus, the spool piece and end connectors create a pressure boundary that contains fluid flowing through the meter. To measure fluid flow through the meter, a pair of transducer assemblies is positioned along the inner surface of the spool piece, such that each transducer assembly faces the other. Each transducer assembly includes a piezoelectric element, and when an alternating current is applied to the piezoelectric element of the first transducer assembly, the piezoelectric element responds by radiating an ultrasonic wave in the fluid being transported through the flow meter. When the wave is incident upon the piezoelectric element of the second transducer assembly, that transducer assembly responds by generating an electric signal. Some time later, an alternating current is applied to the piezoelectric element of the second transducer assembly, and the piezoelectric element responds by radiating an ultrasonic wave through the fluid in the flow meter. When the wave is incident upon the piezoelectric element of the first transducer assembly, that transducer assembly responds by generating an electric signal. In this way, the transducer assemblies transmit and receive signals back and forth across the fluid stream.

Each transducer assembly is connected to a cable that extends through the end connector to the exterior of the spool piece and a remote location, such as an electronics base enclosure typically mounted to the exterior of the spool piece. The cable carries the signal created by the piezoelectric elements to an acquisition board positioned within the electronics base enclosure, where the signal may be processed and subsequently used to determine the fluid flow rate through the meter.

When not in use, the piezoelectric elements in the transducer assemblies can build up an electrical charge. The electric charge presents a hazard to personnel performing maintenance on the flow meter. To reduce the risk to maintenance personnel, each piezoelectric element is typically coupled to a transformer, which, in addition to functions discussed below, provides a discharge path for an electrical charge created by the piezoelectric element.

The transformer also provides impedance matching between the piezoelectric element and an acquisition device that ultimately receives the signal generated by the piezoelectric element. Thus, the piezoelectric element and the transformer are paired. Consequently, the transformer is typically positioned within the transducer assembly. With most conventional designs, when either the piezoelectric element or the transformer requires replacement, the entire transducer assembly is removed from the port in the spool piece, often necessitating an undesirable interruption in fluid flow through the spool piece when the end connector is removed to access the transducer assembly.

Further, in many conventional transducer assemblies, the transformer within the transducer assembly and/or electrical connections between the transformer and the piezoelectric element are susceptible to exposure to the same conditions as those experienced by the piezoelectric element. Such exposure is undesirable when the transformer or electrical connections are not designed for the same conditions as the piezoelectric element. For example, the fluid passing through the flow meter may be corrosive. While the piezoelectric element may be compatible with corrosive conditions, the transformer may not. In such circumstances, the corrosive fluid may damage the transformer and associated electrical wiring.

Mechanisms which improve the quality of the ultrasonic signals imparted to the fluid may improve measurement accuracy. Moreover, wear, tear, and component degradation (e.g., caused by the corrosivity of the fluid being measured) on the components of the meter can substantially decrease longevity of the device, and thus any apparatus, methods or systems that increase the durability and/or longevity of the flow meter and its components would be desirable. Finally, ultrasonic flow meters may be installed in harsh environments, and thus any mechanism to reduce maintenance time, and if possible improve performance, would be desirable.

SUMMARY

These and other needs in the art are addressed in one embodiment by an ultrasonic flow meter for measuring the flow of a fluid through a pipeline. In an embodiment, the flow meter comprises a spool piece including a throughbore and a transducer port extending from the outer surface of the spool piece to the throughbore. In addition, the flow meter comprises a transducer assembly disposed in the transducer port. The transducer assembly has a central axis and comprises a transducer holder having a first end proximal the throughbore of the spool piece, and a second end distal the throughbore of the spool piece. Further, the transducer assembly comprises a piezoelectric capsule including a piezoelectric element. The piezoelectric capsule is coupled to the transducer holder and extends generally axially from the first end of the transducer holder. Still further, the transducer assembly comprises a transformer capsule including a transformer. The transformer capsule is coupled to the transducer holder and is axially spaced apart from the piezoelectric capsule.

These and other needs in the art are addressed in another embodiment by an ultrasonic flow meter for measuring the flow of a fluid through a pipeline. In an embodiment, the flow meter comprises a spool piece including a throughbore and a plurality of transducer ports extending from the outer surface of the spool piece to the throughbore. In addition, the flow meter comprises transducer assembly disposed in one of the transducer ports. The transducer assembly has a central axis and comprises a piezoelectric capsule having a first end proximal the throughbore of the spool piece and a second end distal the throughbore of the spool piece. The piezoelectric capsule includes a piezoelectric housing extending between the first end and the second end. The piezoelectric housing includes a first counterbore extending axially from the first end. Further, the piezoelectric capsule includes a piezoelectric element disposed in the first counterbore proximal the first end. Moreover, the transducer assembly comprises a transformer capsule coupled to the piezoelectric capsule. The transformer capsule comprises a transformer housing and a transformer disposed within the transformer housing. Still further, the transducer assembly comprises an annular seal assembly radially disposed between the transducer assembly and the spool piece, and axially disposed between the transformer capsule and the throughbore of the spool piece. The seal assembly restrict the flow of fluid through the transducer port between the throughbore of the spool piece and the transformer capsule.

These and other needs in the art are addressed in another embodiment by a method for measuring the flow of a fluid through a pipeline. In an embodiment, the method comprises coupling a spool piece to the pipeline. The spool piece includes a throughbore and a transducer port extending from the outer surface of the spool piece to the throughbore. In addition, the method comprises flowing the fluid through the throughbore of the spool piece. Further, the method comprises assembling a gas ultrasonic transducer assembly. The transducer assembly has a central axis and includes a piezoelectric capsule coupled to the spool piece. The piezoelectric capsule includes a piezoelectric housing and a piezoelectric element disposed in the piezoelectric housing. Further, the transducer assembly includes a transformer capsule coupled to the piezoelectric capsule. The transformer capsule includes a transformer housing and a transformer disposed in the transformer housing, and the transformer is electrically coupled to the piezoelectric element. Still further, method comprises disposing the transducer assembling in the transducer port. Moreover, the method comprises exposing the piezoelectric capsule to the fluid flowing in the throughbore of the spool piece. In addition, the method comprises isolating the transformer capsule from the fluid flowing in the throughbore of the spool piece.

Thus, embodiments described herein comprise a combination of features and advantages intended to address various shortcomings associated with certain prior devices, systems, and methods. The various characteristics described above, as well as other features, will be readily apparent to those skilled in the art upon reading the following detailed description, and by referring to the accompanying drawings.

BRIEF DESCRIPTION OF THE DRAWINGS

For a detailed description of exemplary embodiments of the invention, reference will now be made to the accompanying drawings in which.

DETAILED DESCRIPTION

Figure 1A:
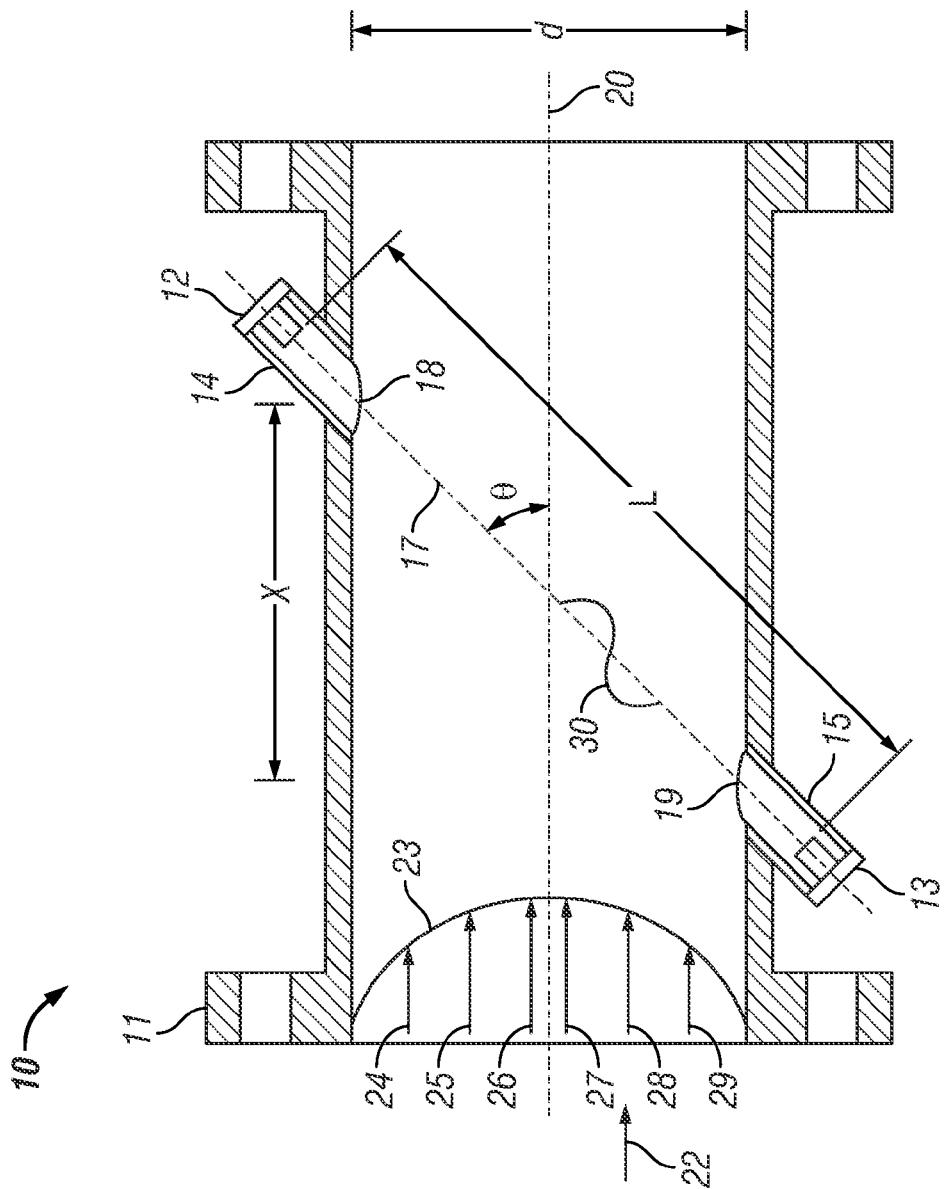
FIG. 1A is a cross-sectional top view of an embodiment of an ultrasonic flow meter.

The following discussion is directed to various embodiments of the invention. Although one or more of these embodiments may be presently preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Certain terms are used throughout the following description and claims to refer to particular features or components. As one skilled in the art will appreciate, different persons may refer to the same feature or component by different names. This document does not intend to distinguish between components or features that differ in name but not function. The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection, or through an indirect connection via other devices, components, and connections. In addition, as used herein, the terms "axial" and "axially" generally mean along or parallel to a central axis (e.g., central axis of a body or a port), while the terms "radial"

and "radially" generally mean perpendicular to the central axis. For instance, an axial distance refers to a distance measured along or parallel to the central axis, and a radial distance means a distance measured perpendicular to the central axis.

Figure 1B:
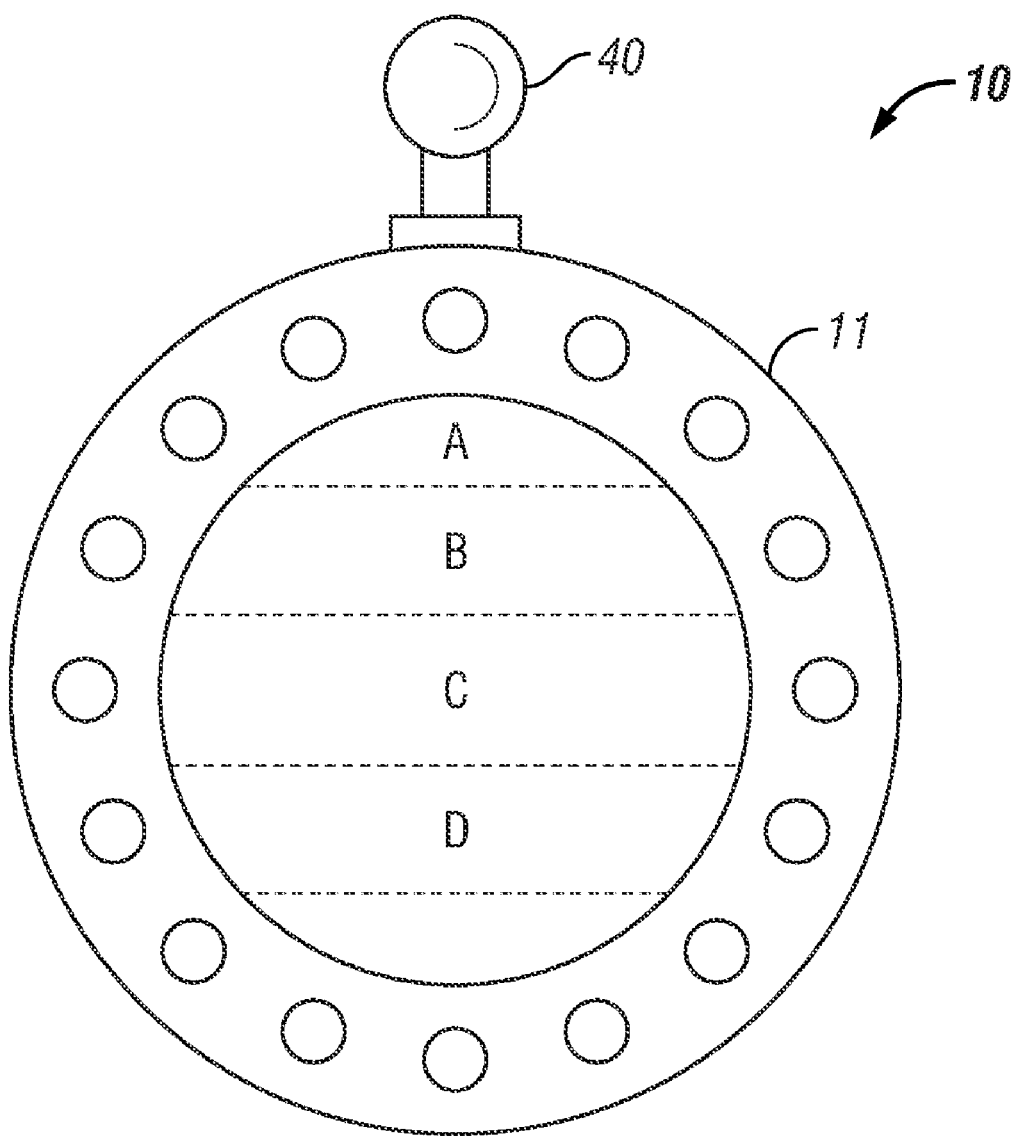
FIG. 1B is an end of the flow meter of FIG. 1A.

FIGS. 1A and 1B show an embodiment of an ultrasonic flow meter 10 in order to explain the various components and relationships. Spool piece 11, suitable for placement between sections of a pipeline, has a predetermined size and defines a central passage through which a measured fluid (e.g., gas and/or liquid) flows. An illustrative pair of transducers 12 and 13, and their respective housings 14 and 15, are located along the length of spool piece 11. Transducers 12 and 13 are acoustic transceivers, and more particularly ultrasonic transceivers, meaning that they both generate and receive acoustic energy having frequencies of above about 20 kilohertz. The acoustic energy may be generated and received by a piezoelectric element in each transducer. To generate an acoustic signal, the piezoelectric element is stimulated electrically by way of a sinusoidal signal, and it responds by vibrating. The vibration of the piezoelectric element generates the acoustic signal that travels through the measured fluid to the corresponding transducer of the transducer pair. Similarly, upon being struck by acoustic energy (i.e., the acoustic signal and other noise signals), the receiving piezoelectric element vibrates and generates a sinusoidal electrical signal that is detected, digitized, and analyzed by electronics associated with the meter.

A path 17, sometimes referred to as a "chord," exists between illustrative transducers 12 and 13 at an angle θ to a centerline 20. The length of "chord" 17 is the distance between the face of transducer 12 and the face of transducer 13. Points 18 and 19 define the locations where acoustic signals generated by transducers 12 and 13 enter and leave fluid flowing through the spool piece 11 (i.e., the entrance to the spool piece bore). The position of transducers 12 and 13 may be defined by the angle θ, by a first length L measured between transducers 12 and 13, a second length X corresponding to the axial distance between points 18 and 19, and a third length "d" corresponding to the pipe inside diameter. In most cases distances d, X and L are precisely determined during meter fabrication. Further, transducers such as 12 and 13 are usually placed a specific distance from points 18 and 19, respectively, regardless of meter size (i.e., spool piece size). A fluid, such as natural gas, flows in a direction 22 with a velocity profile 23. Velocity vectors 24-29 illustrate that the gas velocity through spool piece 11 increases toward the centerline 20.

Initially, downstream transducer 12 generates an acoustic signal that propagates across the fluid in the spool piece 11, and is then incident upon and detected by upstream transducer 13. A short time later (e.g., within a few milliseconds), the upstream transducer 13 generates a return acoustic signal that propagates back across the fluid in the spool piece 11, and is then incident upon and detected by the downstream transducer 12. Thus, the transducers 12 and 13 play "pitch and catch" with signals 30 along chordal path 17. During operation, this sequence may occur thousands of times per minute.

The transit time of the acoustic signal 30 between transducers 12 and 13 depends in part upon whether the acoustic signal 30 is traveling upstream or downstream with respect to the fluid flow. The transit time for an acoustic signal traveling downstream (i.e., in the same direction as the fluid flow) is less than its transit time when traveling upstream (i.e., against the fluid flow). The upstream and downstream transit times can be used to calculate the average velocity along the signal path, and the speed of sound in the measured fluid.

Ultrasonic flow meters can have one or more acoustic signal paths. FIG. 1B illustrates an elevation view of one end of ultrasonic flow meter 10. As shown in FIG. 1B, ultrasonic flow meter 10 actually comprises four chordal paths A, B, C and D at varying levels within the spool piece 11. Each chordal path A-D corresponds to a transducer pair behaving alternately as a transmitter and receiver. Also shown is control electronics package or enclosure 40, which control electronics acquire and process the data from the four chordal paths A-D. Hidden from view in FIG. 1B are the four pairs of transducers that correspond to chordal paths A-D.

Figure 1C:
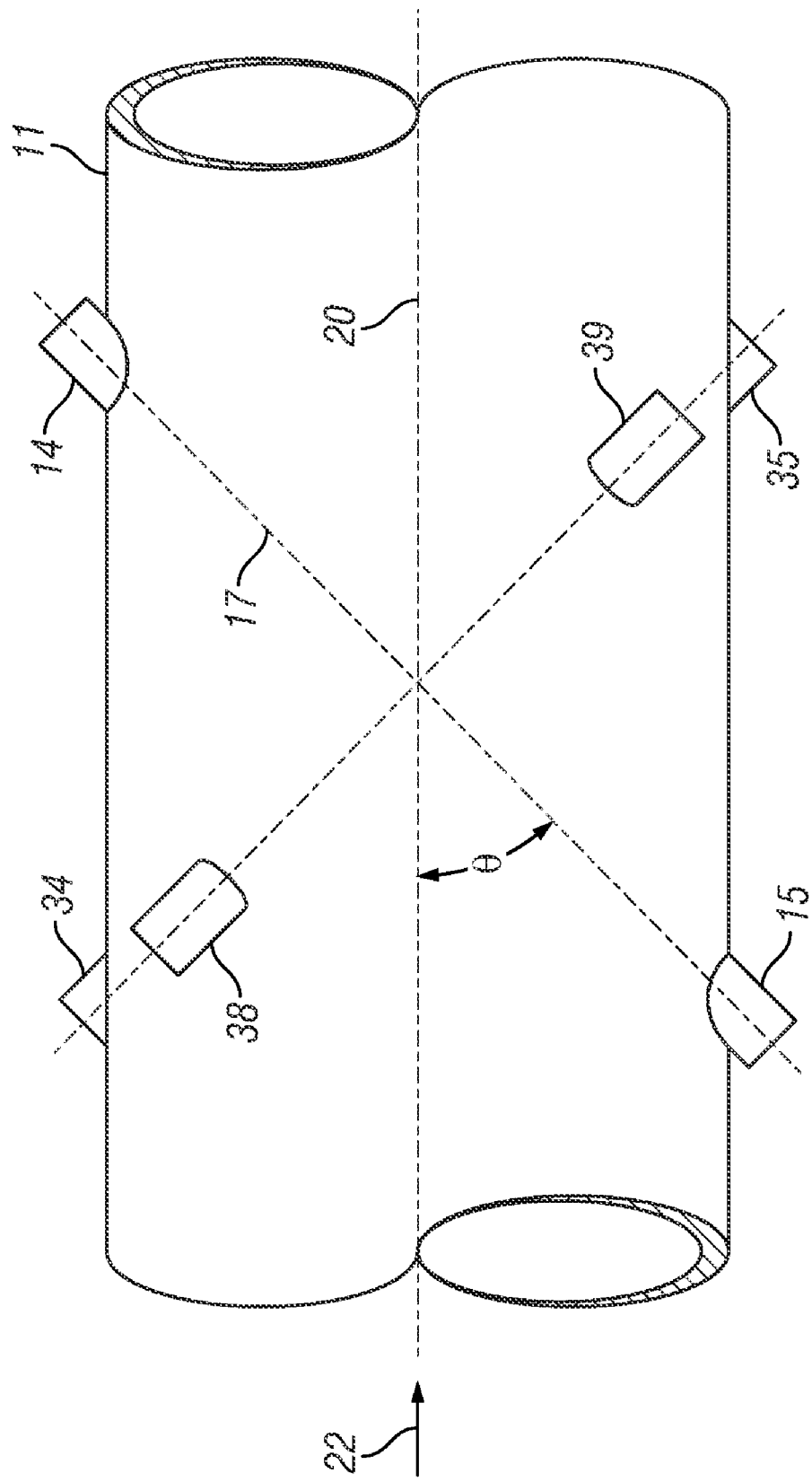
FIG. 1C is a top schematic view of the flow meter of FIG. 1A.

The arrangement of the four pairs of transducers may be more easily understood by reference to FIG. 1C. Four pairs of transducer housings are mounted on spool piece 11. Each pair of transducer housings corresponds to a single chordal path of FIG. 1B. A first pair of housings 14 and 15 comprises transducers 12 and 13 (FIG. 1A). The transducers are mounted at a non-perpendicular angle θ to centerline 20 of spool piece 11. Another pair of housings 34 and 35 (only partially in view) and associated transducers is mounted so that its chordal path loosely forms the shape of an "X" with respect to the chordal path of housings 14 and 15. Similarly, housings 38 and 39 are placed parallel to housings 34 and 35 but at a different "level" (i.e., a different radial position in the pipe or meter spool piece). Not explicitly shown in FIG. 1C is a fourth pair of transducers and transducer housings. Taking FIGS. 1B and 1C together, the pairs of transducers are arranged such that the upper two pairs of transducers corresponding to chords A and B form an the shape of an "X", and the lower two pairs of transducers corresponding to chords C and D also form the shape of an "X". The flow velocity of the fluid may be determined at each chord A-D to obtain chordal flow velocities, and the chordal flow velocities combined to determine an average flow velocity over the entire pipe. From the average flow velocity, the amount of fluid flowing in the spool piece, and thus the pipeline, may be determined.

Figure 2:
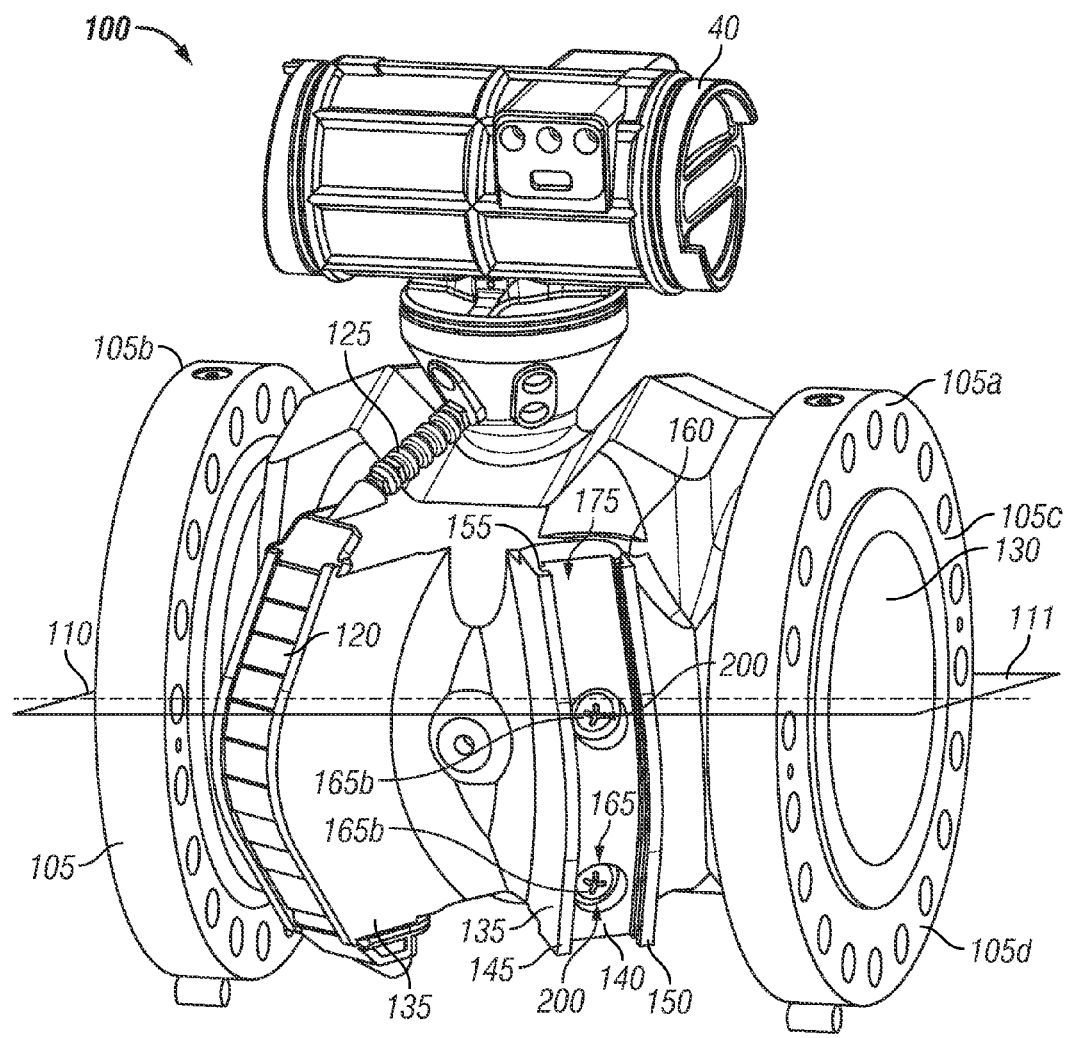
FIG. 2 is a perspective view of an embodiment of an ultrasonic flow meter in accordance with the principles described herein.
Figure 3:
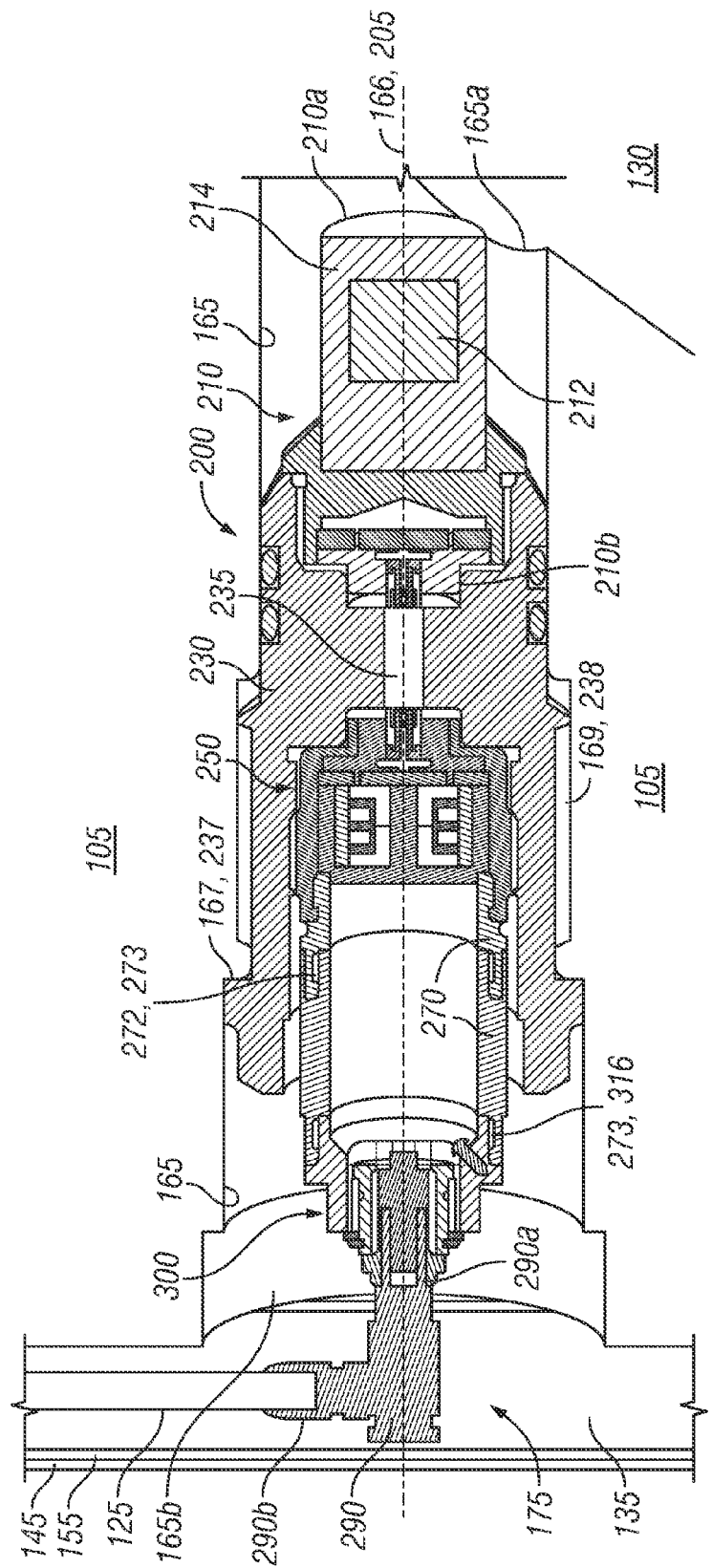
FIG. 3 is an enlarged partial cross-sectional view of an embodiment of a gas ultrasonic transducer assembly disposed in one of the transducer ports of the ultrasonic flow meter of FIG. 2.

Referring now to FIGS. 2 and 3, perspective and partial cross-sectional views, respectively, of an ultrasonic flow meter 100 for measuring fluid flow rates in a pipeline are shown. Ultrasonic flow meter 100 includes a body or spool piece 105, a plurality of gas ultrasonic transducer assemblies 200, an electrical wire or cable 125 extending from each transducer assembly 200 to an electronics package 40 coupled to the top of spool piece 105, and a removable cable cover 120.

Spool piece 105 is the housing for ultrasonic flow meter 100 and configured for placement between sections of a pipeline. Spool piece 105 has a central axis 110 and includes a first or inlet end 105a, a second end or outlet end 105b, a fluid flow passage or throughbore 130 extending between ends 105a, 105b, and a plurality of transducer ports 165 extending from the outer surface of spool piece 105 to throughbore 130. In this embodiment, ends 105a, b each comprise a flange that axially couples spool piece 105 end-to-end between individual pipe segments of a pipeline. A horizontal reference plane 111 passes through central axis 110 and generally divides spool piece 105 into upper and lower halves.

As best shown in FIG. 2, spool piece 105 also includes a plurality of transducer bosses 135 extending generally vertically along its outer circumference. Each boss 135 is positioned such that it intersects the radially outer ends 165b of two vertically spaced transducer ports 165. Each cable 125 extends within one of the bosses 135 from one of the transducer assemblies 200 to the electronics package 40. As two transducer ports 165 intersect each boss 135, two cables 125 extend vertically within each boss 135.

Each transducer boss 135 further includes recessed face 140, sides 145, 150, and side grooves 155, 160. Face 140 and sides 145, 150 define a pocket 175 therebetween that accommodates cables 125. Side grooves 155, 160 extend along the surfaces of sides 145, 150, respectively, that face each other and pocket 175. With cables 125 disposed within pocket 175 of transducer boss 135, the lateral sides cover 120 are inserted into and slidingly advanced through grooves 155, 160, thereby covering cables 125 and protecting them from the environment outside spool piece 105. Examples of suitable covers are disclosed in U.S. patent application Ser. No. 11/763,783, entitled "Cable Cover for an Ultrasonic Flow Meter" and filed on Jun. 15, 2007, which is hereby incorporated herein by reference in its entirety for all purposes.

In some embodiments, spool piece 105 is a casting into which transducer ports 165 are machined. Pockets 175 are also created by the machining process to desired dimensions. The width of face 140 is greater than the diameter of transducer ports 165. The depth of pocket 175 is sufficient to allow side grooves 155, 160, to be machined into sides 145, 150 of transducer boss 135 as well as pocket 175 itself, and sufficient to accommodate cables 125. In some embodiments, side grooves 155, 160 are three-sided grooves with square corners. In other embodiments, side grooves 155, 160 may be half-dovetail grooves with only two sides, where the first side is parallel to face 140 of transducer boss 135 and the second side is oriented at angle less than 90 degrees from the first side. Moreover, in embodiments where side grooves 155, 160 are half-dovetail grooves, the angle of sides 145, 150 with respect to face 140 may be less than or greater than 90 degrees.

As best shown in FIG. 3, one transducer assembly 200 is disposed within each transducer port 165. Each transducer port 165 has a central axis 166 and extends through spool piece 105 from a radially inner (relative to axis 110) or first end 165a at throughbore 130 to a radially outer (relative to axis 110) or second end 165b at the outer surface of the spool piece 105. In this embodiment, each transducer port 165 is generally horizontal. In other words, central axis 166 of each transducer port 165 lies in a plane generally parallel to reference plane 111. Although a projection of central axis 166 of each transducer port 165 may not necessarily intersect central axis 110 of spool piece 105, for purposes of simplicity, the radial positions of various features and components may be described relative to axis 110, it being generally understood that "radially inner" (relative to axis 110) refers to positions generally proximal axis 110 and bore 130 and "radially outer" (relative to axis 110) refers to positions generally distal axis 110 and bore 130.

The inner surface of each transducer port 165 includes an annular shoulder 167 between ends 165a, b and internal threads 169 positioned axially (relative to axis 166) between shoulder 167 and first end 165a. As will be described in more detail below, shoulder 167 aids in positioning transducer assembly 200 within port 165, and threads 169 engage mating threads on transducer assembly 200, thereby threadingly coupling transducer assembly 200 to port 165 and spool piece 105.

Referring again to FIGS. 2 and 3, during use, fluid flows through the pipeline and throughbore 130. Transducer assemblies 200 send acoustic signals back and forth across the fluid stream in throughbore 130. In particular, transducer assemblies 200 are positioned such that an acoustic signal traveling from one transducer assembly 200 to the other intersects fluid flowing through meter 100 at an acute angle relative to central axis 110. The electronics package 40 is coupled to the top of the spool piece 105, provides power to transducer assemblies 200, and receives signals from transducer assemblies 200 via cables 125 extending therebetween. Upon receipt of the signals from transducer assemblies 200, the electronics package processes the signals to determine the fluid flow rate of product passing through bore 130 of flow meter 100.

Referring now to FIG. 3, gas ultrasonic transducer assembly 200 is coaxially disposed within port 165 and extends from throughbore 130 to pocket 175 of boss 135. Thus, transducer assembly 200 has a central or longitudinal axis 205 that is generally coincident with central axis 166 of port 165 when transducer assembly 200 is coupled to spool piece 105 within port 165. Moving radially outward from throughbore 130 of spool piece 105, transducer assembly 200 comprises a piezoelectric capsule 210, a transducer holder 230, a transformer capsule 250, a plurality of transformer capsule spacers 270, a receptacle capsule 300, and an electrical coupling 290. Piezoelectric capsule 210, transducer holder 230, transformer capsule 250, transformer capsule spacers 270, and receptacle capsule 300 are axially coupled end-to-end and coaxially oriented relative to axes 166, 205. Thus, piezoelectric capsule 210, transducer holder 230, transformer capsule 250, transformer capsule spacers 270, and receptacle capsule 300 each have a central axis generally coincident with axes 205, 166. For purposes of conciseness, axes 166, 205 are used herein to define axial positions of various features and components of transducer assembly 200, it being understood that each individual component has a central axis generally coincident with axis 205 when assembled into transducer assembly 200, and generally coincident with axis 166 when installed in port 165.

Figure 4:
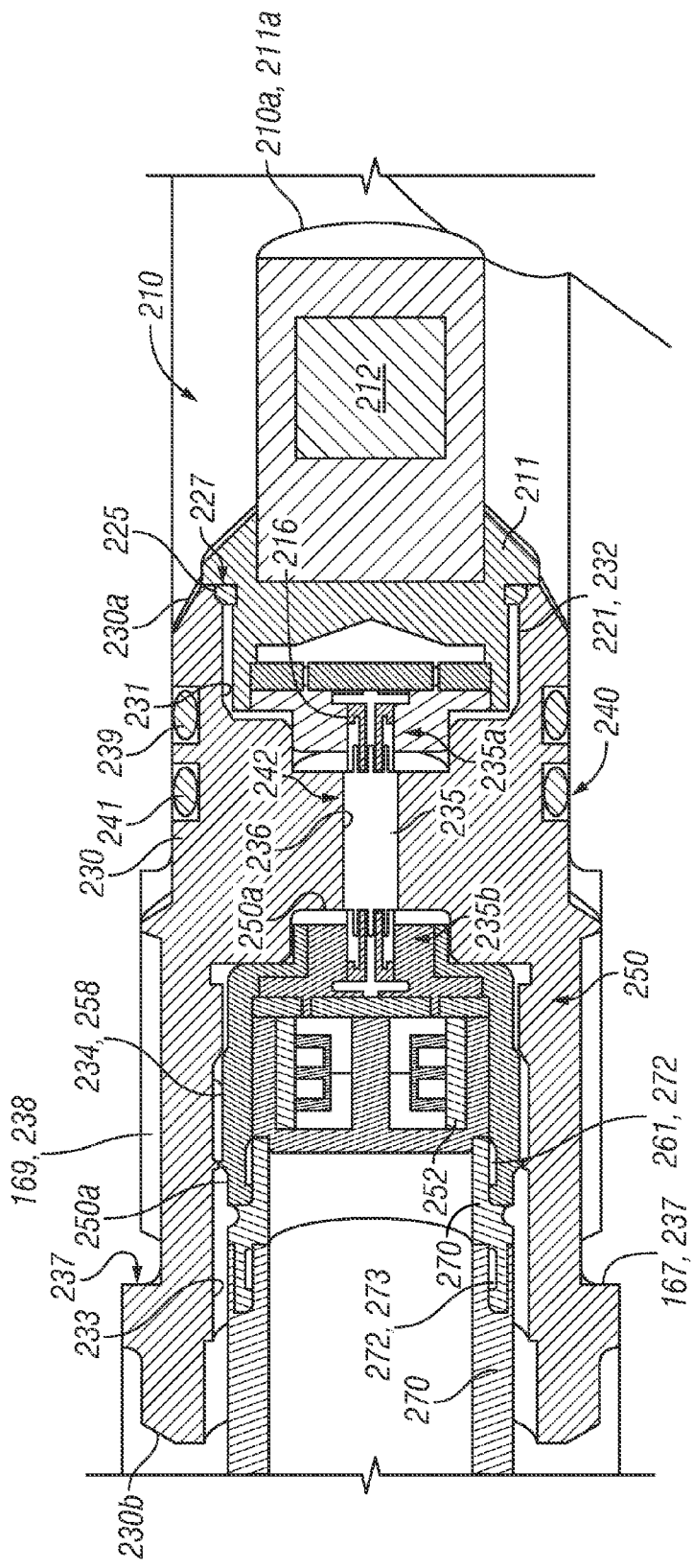
FIG. 4 is an enlarged partial cross-sectional view of the gas ultrasonic transducer assembly of FIG. 3.
Figure 5:
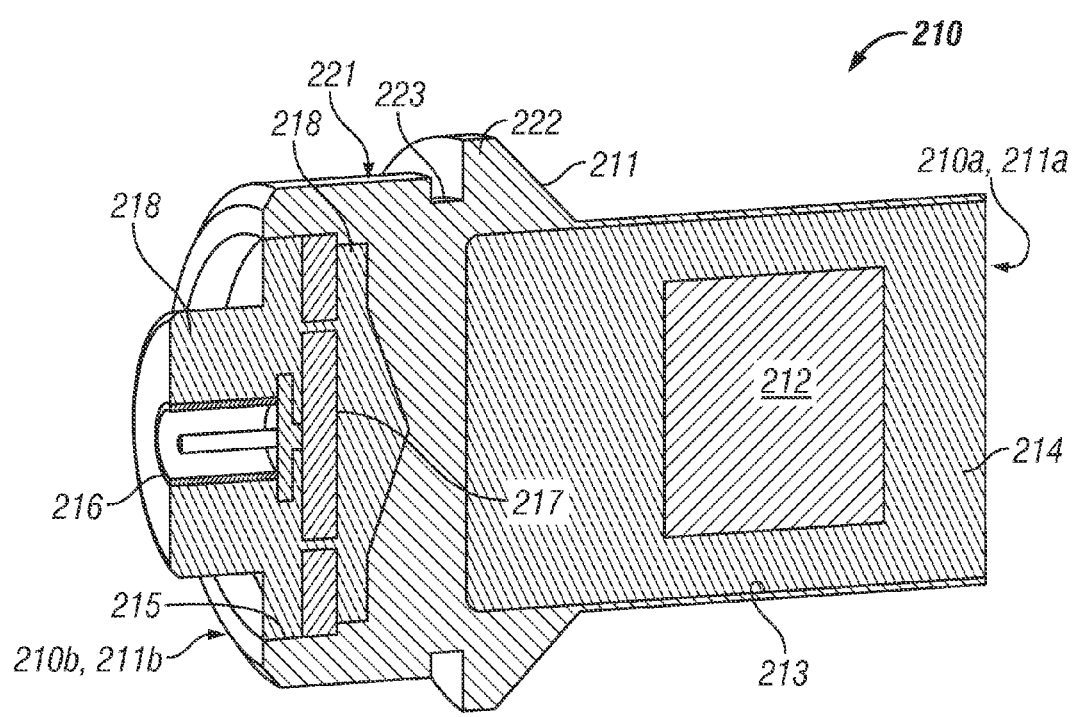
FIGS. 5 and 6 are enlarged cross-sectional views of the piezoelectric capsule of FIG. 2.

Referring now to FIGS. 3-6, piezoelectric capsule 210 has a radially inner (relative to axis 110) or first end 210a proximal bore 130, a radially outer (relative to axis 110) or second end 210b distal bore 130, and comprises a body or housing 211, a piezoelectric element 212, a matching layer 214, and an electrical connector 216. In FIGS. 3-5, piezoelectric capsule 210 is shown with matching layer 214 (e.g., after installation of matching layer 214), and in FIG. 6, piezoelectric capsule 210 is shown without matching layer 214 (e.g., prior to inclusion of matching layer 214).

Housing 211 extends axially (relative to axis 205) between ends 210a, b, and thus, may also be described as having first and second ends 211a, b generally coincident with ends 210a, b, respectively. First ends 210a, 211a of piezoelectric capsule 210 and housing 211, respectively, extend axially (relative to axes 166, 205) to bore 130 and are exposed to the fluid flowing within throughbore 130. In addition, first end 211a of housing 211 includes a counterbore 213 that extends axially (relative to axis 205) from first end 211a. Piezoelectric element 212 is coaxially disposed in counterbore 213 proximal first end 211a and bore 130. Piezoelectric element 212 is a piezoelectric material that produces an electrical potential in response to applied mechanical stress, and produces a mechanical stress and/or strain in response to an applied electric field. More specifically, piezoelectric element 212 produces an electrical potential and associated current in response to an acoustic signal, and produces an acoustic signal in response to an applied electrical potential and associated current. In general, piezoelectric element 212 may comprises any suitable piezoelectric material such as a piezoelectric crystal or ceramic. However, in this embodiment, piezoelectric element 212 is a piezoelectric crystal.

Matching layer 214 fills the remainder of counterbore 213 and completely surrounds or encases piezoelectric element 212. The matching layer (e.g., matching layer 214) may comprise any suitable material such as plastic, metal, glass, ceramic, epoxy, powder-filled epoxy, rubber, or powder-filled rubber. In this embodiment, matching layer 214 comprises epoxy that is injected into counterbore 213 and around and over piezoelectric element 212 in a fluid form and allowed to cure and harden. Regardless of the material of the matching layer (e.g., matching layer 214), the matching layer provides acoustical coupling between the piezoelectric element (e.g., piezoelectric element 212) and fluid flowing through the meter (e.g., fluid flowing in bore 130 of flow meter 100). In accordance with certain embodiments disclosed herein, the acoustic matching layer has an acoustic impedance between that of the piezoelectric element and fluid within the meter. With the acoustic impedance of the matching layer between that of the piezoelectric element and the fluid in the meter, the quality of the ultrasonic signal is improved (e.g., larger amplitude and faster rise time).

Referring still to FIGS. 3-6, matching layer 214, and piezoelectric element 212, are coupled to housing 211 within counterbore 213. In general, matching layer 214 may be coupled to housing 211 by any suitable means including, without limitation, bonding, interference or spring fit, a engagement of mating threads, acoustic coupling oil, grease or adhesive. In this embodiment, matching layer 214 is directly connected to the inner cylindrical surface of counterbore 213 of housing 211 by the adhesive bond of the epoxy.

Figure 6:
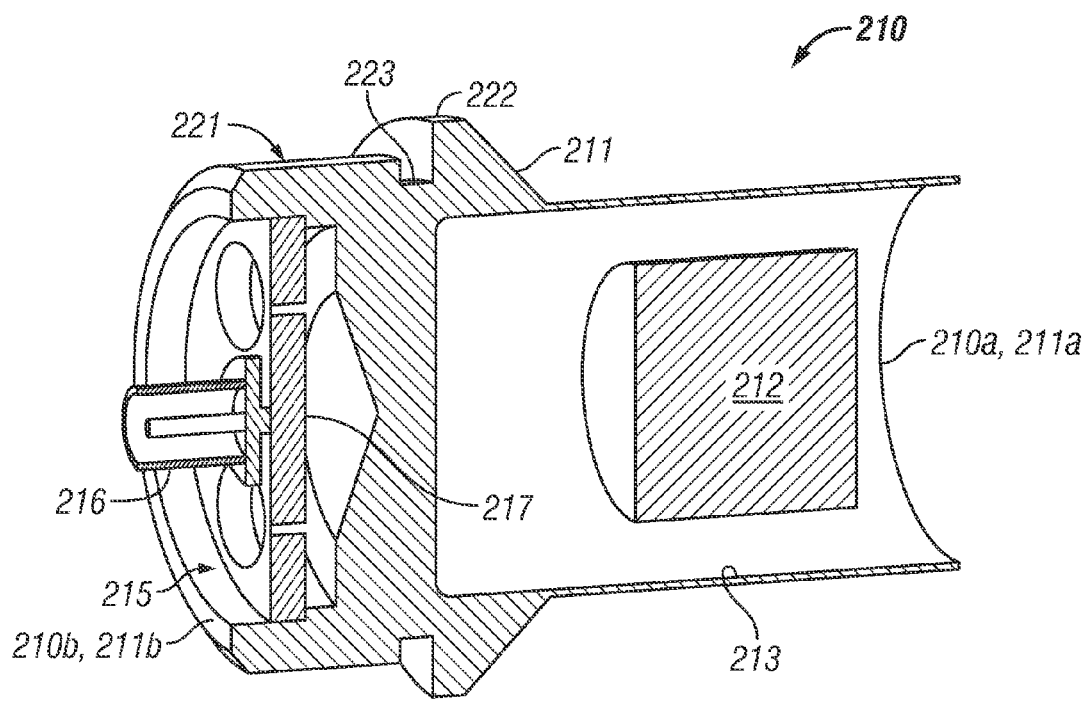

As best shown in FIGS. 5 and 6, electrical connector 216 is disposed at second end 210b of piezoelectric capsule 210 and is coupled to second end 211b of housing 211. In particular, second end 211b of housing 211 includes a counterbore 215 that extends axially (relative to axis 205) from second end 211b. Electrical connector 216 is surface mounted to and extends axially (relative to axis 205) from a circuit board 217 disposed in counterbore 215. In this embodiment, electrical connector 216 is a female coax receptacle or plug socket. In general, "coax" connectors (e.g., male coax connectors, female coax connectors, coax sockets, coax receptacles, etc.) are connectors configured and designed for use coaxial, or coax, cables and couplings. Coaxial cables and couplings include an inner electrical conductor surrounded by a tubular insulating layer typically of a flexible material with a high dielectric constant, all of which are surrounded by an electrically conductive layer (typically of fine woven wire for flexibility, or of a thin metallic foil), and finally covered with a thin insulating layer on the outside. Thus, coax cables and couplings include a radially inner conductor and a radially outer conductor that is concentric with the inner conductor and radially spaced from the inner conductor by a tubular insulating layer.

Two leads or wires (not shown) electrically couple piezoelectric element 212 to circuit board 217 and electrical connector 216. Circuit board 217 in piezoelectric capsule 210 preferably includes a resistor between the two piezoelectric leads to allow electrical charges in piezoelectric element 212 to safely discharge when piezoelectric capsule 210 is decoupled from transformer capsule 250. In this embodiment, circuit board 217 includes a one mega ohm resistor (not shown) between the two piezoelectric leads to allow electrical charges in piezoelectric element 212 to safely discharge when piezoelectric capsule 210 is decoupled from transformer capsule 250.

Circuit board 217 and electrical connector 216 are rigidly held in place relative to housing 211 by a fill material 218 that fills the remainder of counterbore 215 and is disposed about the circumference of electrical connector 216. In FIG. 5, piezoelectric capsule 210 is shown with fill material 218 (e.g., after installation of fill material 218 in counterbore 213), and in FIG. 6, piezoelectric capsule 210 is shown without fill material 218 (e.g., prior to inclusion of fill material 218 in counterbore 213). In general, the fill material (e.g., fill material 218) may comprise any suitable material such as plastic or epoxy. Fill material 218 preferably creates an adhesive bond with circuit board 217, electrical connector 216, any resistors and wire leads in counterbore 215, and housing 211 to rigidly hold each of these components in place. In this embodiment, fill material 218 is a rigid epoxy similar to matching layer 214.

Referring still to FIGS. 3-6, the radially outer surface of housing 211 (relative to axis 205) includes external threads 221 at second end 211b, an annular flange 222 between ends 211a, b, and an annular recess or groove 223 axially disposed (relative to axis 205) adjacent flange 222 between threads 221 and flange 222. As best shown in FIGS. 3 and 4, annular groove 223 and an annular seal member 225 disposed therein define a seal assembly 227 positioned radially (relative to axis 205) between housing 211 and transducer holder 230. Seal assembly 227 forms an annular seal between housing 211 and transducer holder 230, and restricts and/or prevents the axial flow of fluid (e.g., relative to axis 205) between transducer holder 230 and housing 211. For example, seal assembly 227 restricts and/or prevents fluid in bore 130 from flowing between housing 211 and transducer holder 230. In this embodiment, annular seal member 225 is an elastomeric O-ring seal that is radially compressed between housing 211 and transducer holder 230 upon assembly.

Referring now to FIGS. 3 and 4, transducer holder 230 has a radially inner (relative to axis 110) or first end 230a proximal bore 130, and a radially outer (relative to axis 110) or second end 230b distal bore 130. Each end 230a, b includes a counterbore 231, 233, respectively, with internal threads 232, 234, respectively. Counterbores 231, 233 extend axially (relative to axis 205) from ends 230a, 230b, respectively. Second end 210b of piezoelectric capsule 210 is threadingly received by counterbore 231 via mating threads 221, 232, and as will be described in more detail below, transformer capsule 250 is threadingly received by counterbore 233. The engagement of mating threads 221, 232 is preferably sufficient to resist potential forces resulting from trapped pressurized fluids that may have undesirably permeated seal assembly 227 over time. Such a robust engagement of threads 221, 232 may be important when transducer holder 230 and piezoelectric capsule 210 are removed from port 165 or when pressure within bore 130 is lowered. Any gas trapped between transducer holder 230 and piezoelectric capsule 210 may be vented around seal assembly 227 when piezoelectric capsule 210 is unthreaded from transducer holder 230.

An electrical coupling 235 is coaxially disposed in a throughbore 236 that extends axially (relative to axis 205) through transducer holder 230 between counterbores 231, 233. Coupling 235 includes ends 235a, b connected to piezoelectric capsule 210 and transformer capsule 250, respectively. Coupling 235 electrically couples piezoelectric capsule 210 and transformer capsule 250 and allows communication of data relating to the fluid flowing in bore 130 from piezoelectric capsule 210 to transformer capsule 250. In this embodiment, electrical coupling 235 is a coaxial, or "coax," coupling that includes coax connectors at each end 235a, b. As will be described in more detail below, in this embodiment, coax connectors at ends 235a, b are each male coax connectors that mate and engage corresponding female coax connectors in transformer capsule 250 and piezoelectric capsule 210.

Referring still to FIGS. 3 and 4, an annular seal 242 is formed between electrical coupling 235 and transducer holder 230, thereby restricting and/or preventing the axial flow of fluids (relative to axis 205) between coupling 235 and transducer holder 230. Annular seal 242 formed between coupling 235 and transducer holder 230 is preferably sufficient to withstand the anticipated fluid pressures in bore 130, typically between about 1 psi and 10,000 psi. Consequently, in the event pressurized fluid within bore 130 permeates or bypasses seal assembly 227 over time, annular seal 242 provides yet another barrier to restrict and/or prevent fluids in bore 130 from reaching transformer capsule 250, spacers 270, receptacle capsule 300 and the environment external flow meter 100. In this embodiment, seal 242 is a glass seal between coupling 235 and transducer holder 230.

The radially outer (relative to axis 205) surface of transducer holder 230 includes an annular shoulder 237 proximal second end 230b, external threads 238 positioned between shoulder 237 and first end 230a, and a plurality of annular recesses or grooves 239 axially positioned (relative to axis 205) between external threads 238 and first end 230a. An annular seal member 241 is disposed in each groove 239. Together, grooves 239 and seals 241 disposed therein define seal assemblies 240 positioned radially (relative to axis 205) between transducer holder 230 and spool piece 105. Seal assemblies 240 restricts and/or prevents the axial flow of fluid (relative to axis 205) between transducer holder 230 and spool piece 105. Consequently, seal assemblies restrict and/or prevent fluids in bore 130 from flowing between transducer holder 230 and spool piece 105. In this embodiment, each annular seal member 241 is an elastomeric O-ring seal that is radially compressed between spool piece 105 and transducer holder 230 upon assembly.

As previously described, seal assembly 227 restricts and/or prevents the flow of fluid (e.g., fluid flowing in bore 130) between transducer holder 230 and housing 211, annular seal 242 restricts and/or prevents the axial flow of fluids (relative to axis 205) between coupling 235 and transducer holder 230, and seal assemblies 240 restrict and/or prevent the flow of fluid between transducer holder 230 and spool piece 105. Thus, seal assembly 227, seal assemblies 240, and seal 242 work together to restrict and/or prevent potentially hazardous, contaminating, or corrosive fluids in bore 130 from escaping bore 130 via port 165. Restricting and/or preventing the flow of fluids from bore 130 through port 165 may be particularly important in situations where the fluid in bore 130 contains toxic and/or poisonous substances (e.g., the fluid is a hydrocarbon stream containing hydrogen sulfide). Seal assembly 227, seal assemblies 240, and seal 242 also function to maintain the pressure differential between ambient conditions external spool piece 105 and the pressurized fluid in bore 130. Thus, although piezoelectric capsule 210 is exposed to the fluid in bore 130 and associated pressures, transformer capsule 250, spacers 270, and receptacle capsule 300 are isolated from the fluid and pressure within bore 130. In particular, transformer capsule 250, spacers 270, and receptacle capsule 300 are merely subjected to the ambient pressures external spool piece 105.

Transducer holder 230 is threadingly coupled to spool piece 105 via mating threads 169, 238, and annular shoulder 237 of transducer holder 230 engages annular shoulder 167 of port 165. During assembly, transducer holder 230 is threaded and axially advanced into port 165 (relative to axis 166) until shoulders 167, 237 engage, thereby preventing continued axial advancement of transducer holder 230 (and transducer assembly 200) into port 165. Thus, shoulder 167 in port 165 defines the axial position of transducer holder 230 (and transducer assembly 200) within port 165.

Referring now to FIGS. 3, 4, 7, and 8, transformer capsule 250 has a radially inner (relative to axis 110) or first end 250a, a radially outer (relative to axis 110) or second end 250b, and includes a body or housing 251, a transformer 252, and an electrical connector 253. Housing 251 extends axially (relative to axis 205) between ends 250a, b, and thus, may also be described as having first and second ends 251a, b coincident with ends 250a, b, respectively. In addition, housing 251 includes a throughbore 254 extending axially (relative to axis 205) between ends 251a, b.

Figure 7:
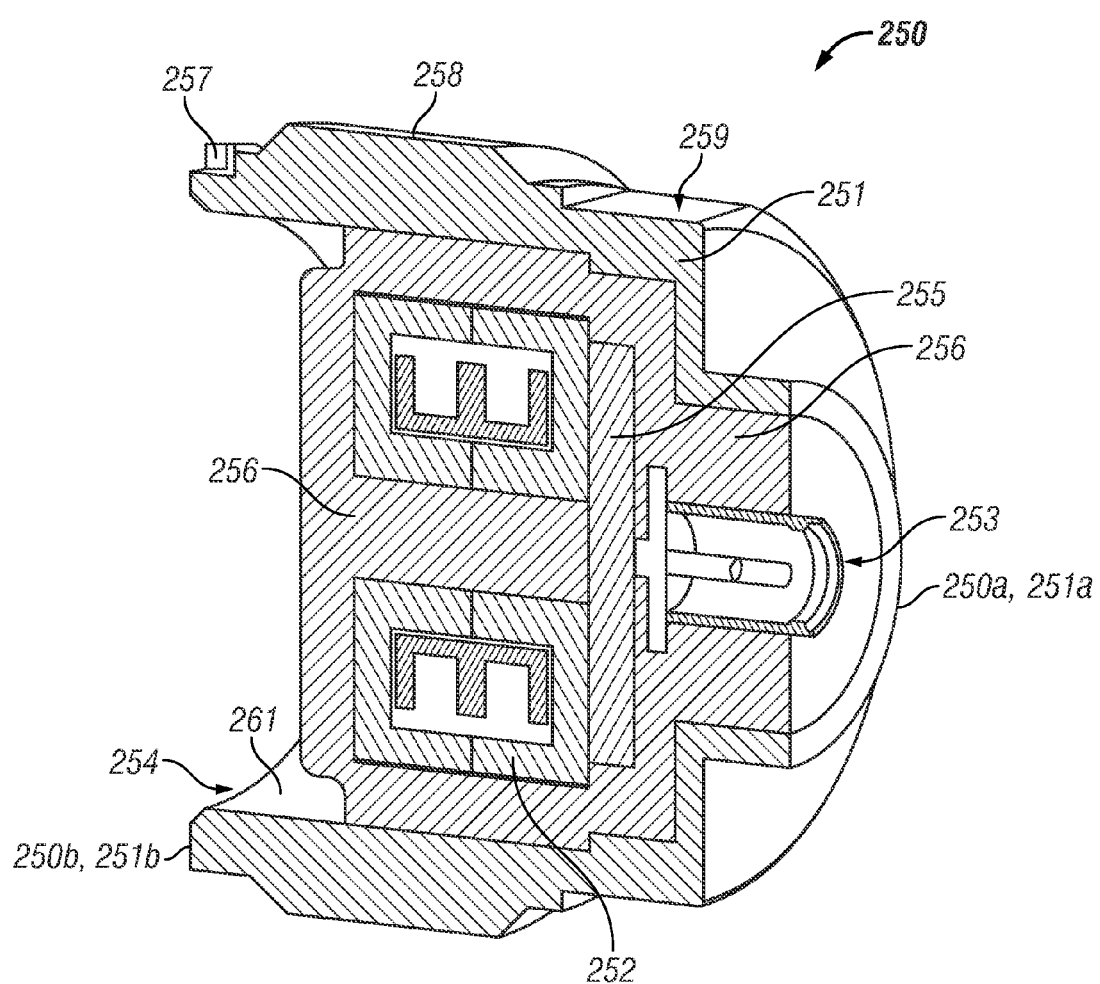
FIGS. 7 and 8 are enlarged cross-sectional views of the transformer capsule of FIG. 2.
Figure 8:
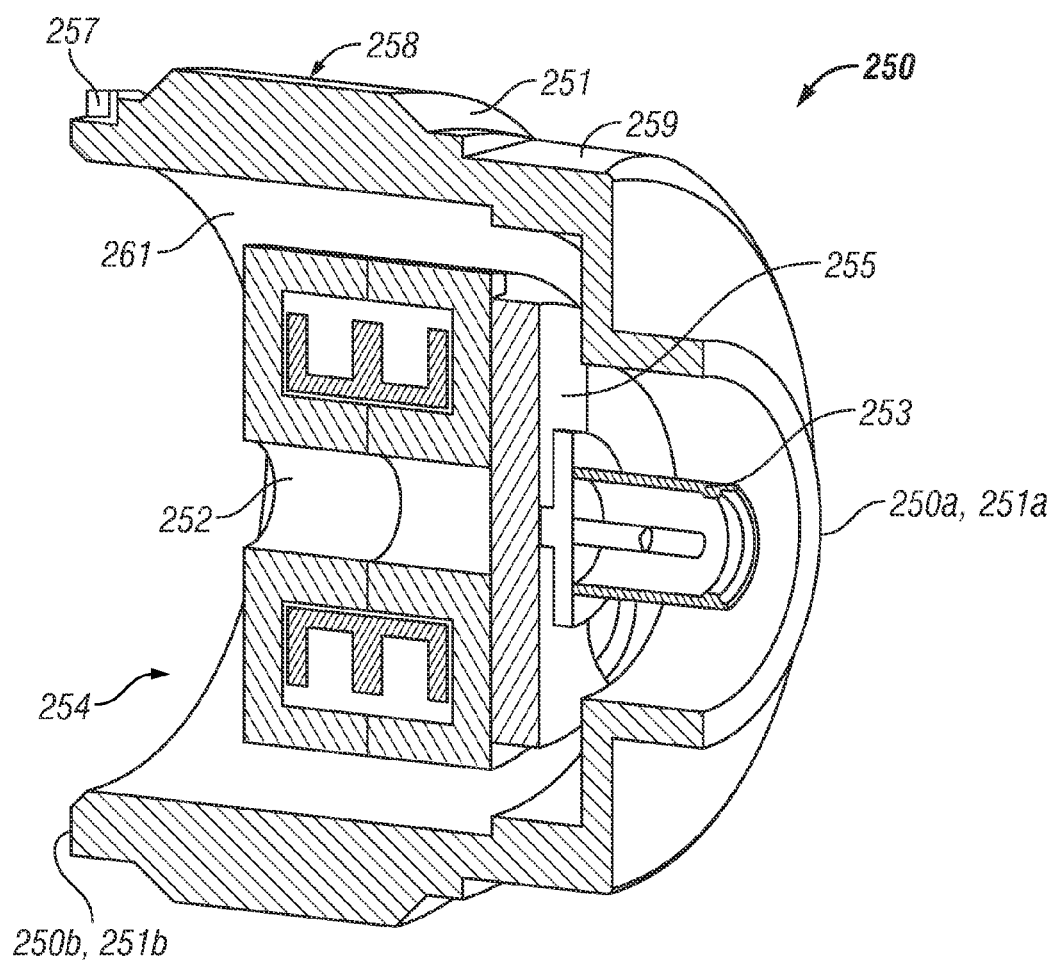

As best shown in FIGS. 7 and 8, electrical connector 253 is disposed at first end 250a of transformer capsule 250 and is coupled to first end 251a of housing 251. In particular, electrical connector 253 is surface mounted to and extends axially (relative to axis 205) from a circuit board 255 disposed in throughbore 254. In this embodiment, electrical connector 253 is a female coax receptacle or plug socket. A first pair of leads or wires (not shown) electrically couple transformer 252 to circuit board 255 and electrical connector 253, and a second pair of leads or wires (not shown) electrically couple transformer 252 and receptacle capsule 300. In general, transformer 252 matches the impedance of the piezoelectric element 212 to the electronics.

Circuit board 255 and electrical connector 253 are rigidly held in place relative to housing 251 within throughbore 254 by a fill material 256 that fills the remainder of throughbore 254. In FIG. 7, transformer capsule 250 is shown with fill material 256 (e.g., after installation of fill material 256 in throughbore 254), and in FIG. 8, transformer capsule 250 is shown without fill material 256 (e.g., prior to inclusion of fill material 256 in throughbore 254). In general, the fill material (e.g., fill material 256) may comprise any suitable material such as plastic or epoxy. Fill material 256 preferably creates an adhesive bond between circuit board 255, electrical connector 253, the wire leads, and the housing 251 sufficient to rigidly hold these components in position. In this embodiment, filler 256 is a rigid epoxy similar to matching layer 214.

Referring still to FIGS. 3, 4, 7, and 8, the radially outer (relative to axis 205) surface of housing 251 includes a notch or recess 257 at second end 251b, external threads 258 between ends 251a, b, and a plurality of planar flats 259 proximal first end 251a. Specifically, external threads 258 are axially disposed (relative to axis 205) between second end 251b and flats 259, and flats 259 are axially disposed (relative to axis 205) between external threads 258 and first end 251a. In this embodiment, two flats 259 angularly spaced 180° apart are provided on housing 251. In general, flats 259 provide opposed planar surfaces for engagement and gripping of transformer capsule 250 with a wrench, which may be used to rotate transformer capsule 250 relative to other components. The radially inner surface of housing 251 (relative to axis 205) includes internal threads 261 at second end 251b.

As best shown in FIGS. 3 and 4 and previously described, electrical coupling 235 is disposed in throughbore 236 and extends between piezoelectric capsule 210 and transformer capsule 250. Ends 235a, b of coax coupling engage and mate with electrical connectors 216, 253, respectively, thereby electrically coupling piezoelectric capsule 210 and transformer capsule 250. In particular, transformer capsule 250 is threadingly advanced into counterbore 233 of transducer holder 230 via mating threads 234, 258 until the male coax connector 235b is sufficiently received and seated in mating electrical connector 253. Likewise, second end 210b of piezoelectric capsule 210 is threadingly advanced into counterbore 231 of transducer holder 230 via mating threads 221, 232 until male coax connector 235a is sufficiently received and seated in mating electrical connector 216. Thus, piezoelectric capsule 210 and transformer capsule 250 are axially spaced apart (relative to axis 205) by electrical coupling 235.

Figure 9:
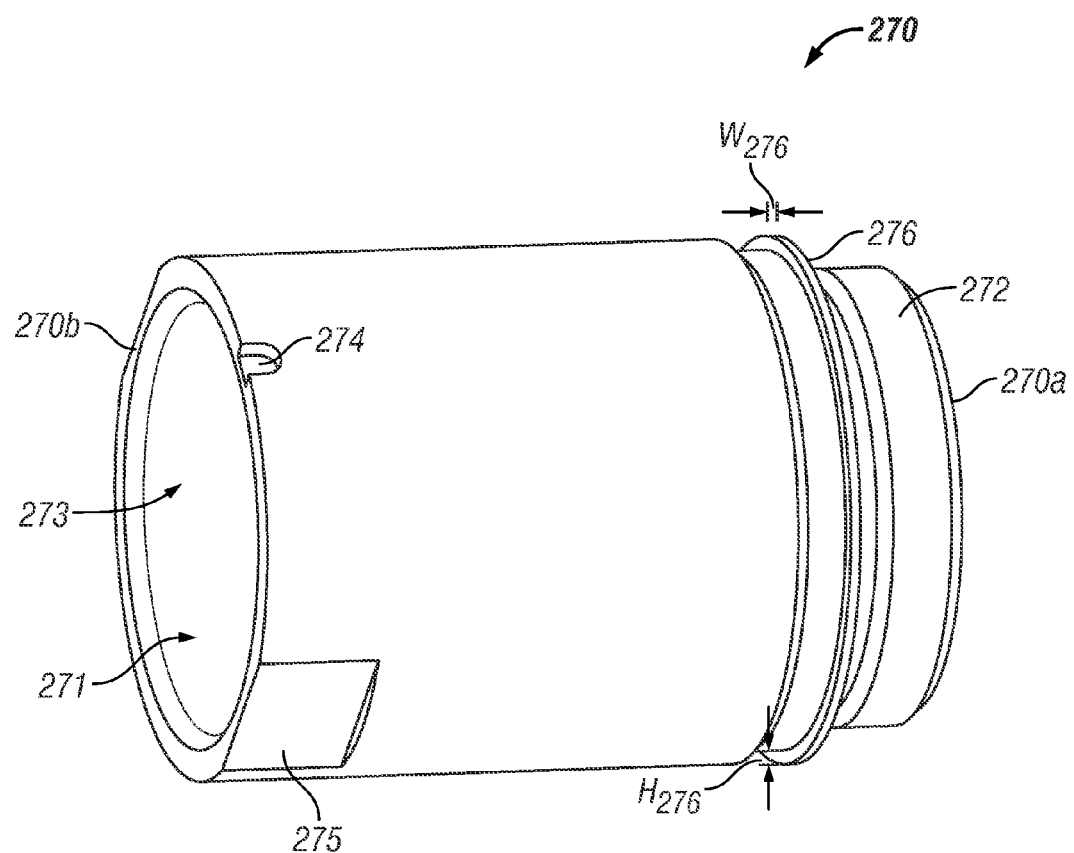
FIG. 9 perspective view of the transformer capsule spacer of FIG. 2.

Referring now to FIGS. 3, 4, and 9, each generally cylindrical spacer 270 has a radially inner (relative to axis 110) or first end 270a, a radially outer (relative to axis 110) or second end 270b, and includes a throughbore 271 extending between ends 270a, b. First end 270a includes external threads 272, and second end 270b includes internal threads 273. In addition, the radially outer surface of each spacer 270 (relative to axis 205) includes a recess or notch 274, a plurality of planar flats 275, and an annular ring or flange 276. Notch 274 and flats 275 are positioned at second end 270b, while annular flange 276 is positioned proximal first end 270a. Notch 274 and flats 275 each extend axially (relative to axis 205) from second end 270b. In this embodiment, two flats 275 angularly spaced 180° apart are provided on each spacer 270. In general, flats 275 provide opposed planar surfaces for engagement and gripping of spacer 270 with a wrench, which may be used to rotate spacer 270 relative to other components. As best shown in FIG. 9, flange 276 has a height $H_{276}$ measured radially (relative to axis 205) that is greater that its width $W_{276}$ measured axially (relative to axis 205), and thus, may also be described as a "thin" ring or flange. As will be described in more detail below, flange 276 of each spacer 270 is configured to be "thin" such that is may be deformed and bent into the mating notch (e.g., notch 274 or notch 257 previously described). Although only one spacer 270 is shown in detail in FIG. 9, each spacer 270 is similarly configured. However, the axial length of each spacer 270 may be varied as appropriate.

Referring specifically to FIGS. 3 and 4, each spacer 270 is threadingly coupled to an adjacent component in transducer assembly 200. For purposes of the description to follow, the rightmost spacer 270 shown in FIGS. 3 and 4 will be referred to as "first spacer 270," and the leftmost spacer 270 in FIGS. 3 and 4 will be referred to as "second spacer 270." In this embodiment, first end 270a of first spacer 270 is threadingly received by throughbore 254 of transformer capsule 250 at second end 250b, and first end 270a of the second spacer 270 is threadingly received by throughbore 271 at second end 270b of the first spacer 270. In particular, first spacer 270 is threadingly advanced into throughbore 254 via mating threads 261, 272 until flange 276 of first spacer 270 engages or abuts second end 250b of transformer capsule 250, and second spacer 270 is threadingly advanced into through bore 271 at second end 270b of second spacer 270 via mating threads 272, 273 until flange 276 of second spacer 270 engages or abuts second end 270b of first spacer 270. Upon engagement of flange 276 of first spacer 270 and second end 250b of transformer capsule 250, flange 276 is deformed and bent into engagement with mating notch 257 of transformer capsule 250, thereby restricting and/or preventing the rotation of spacer 270 relative to transformer capsule 250. Likewise, upon engagement of flange 276 of second spacer 270 and second end 270b of first spacer 270, flange 276 is deformed and bent into engagement with mating notch 274 of first spacer 270, thereby restricting and/or preventing the rotation of second spacer 270 relative to first spacer 270. To enable the deformation and bending of flange 276, each transformer spacer 270 preferably comprise a malleable metal such as aluminum or brass. Further, each spacer 270 may be nickel plated or anodized to enhance corrosion resistance. As will be described in more detail below, although two transformer spacers 270 are shown in transducer assembly 200 of FIG. 3, in general, any number of transformer spacers 270 may be employed in each gas ultrasonic transducer assembly 200.

Referring now to FIGS. 3 and 10-13, receptacle capsule 300 comprises a housing 310, a retainer 320, a holder 330, and a receptacle 340. Housing 310, retainer 320, holder 330, and receptacle 340 are concentrically and coaxially arranged, each generally centered about a common central axis (e.g., axis 205). Specifically, retainer 320 is radially disposed within housing 310, holder 330 is radially disposed within retainer 320, and receptacle 340 is radially disposed within holder 330.

Figure 12:
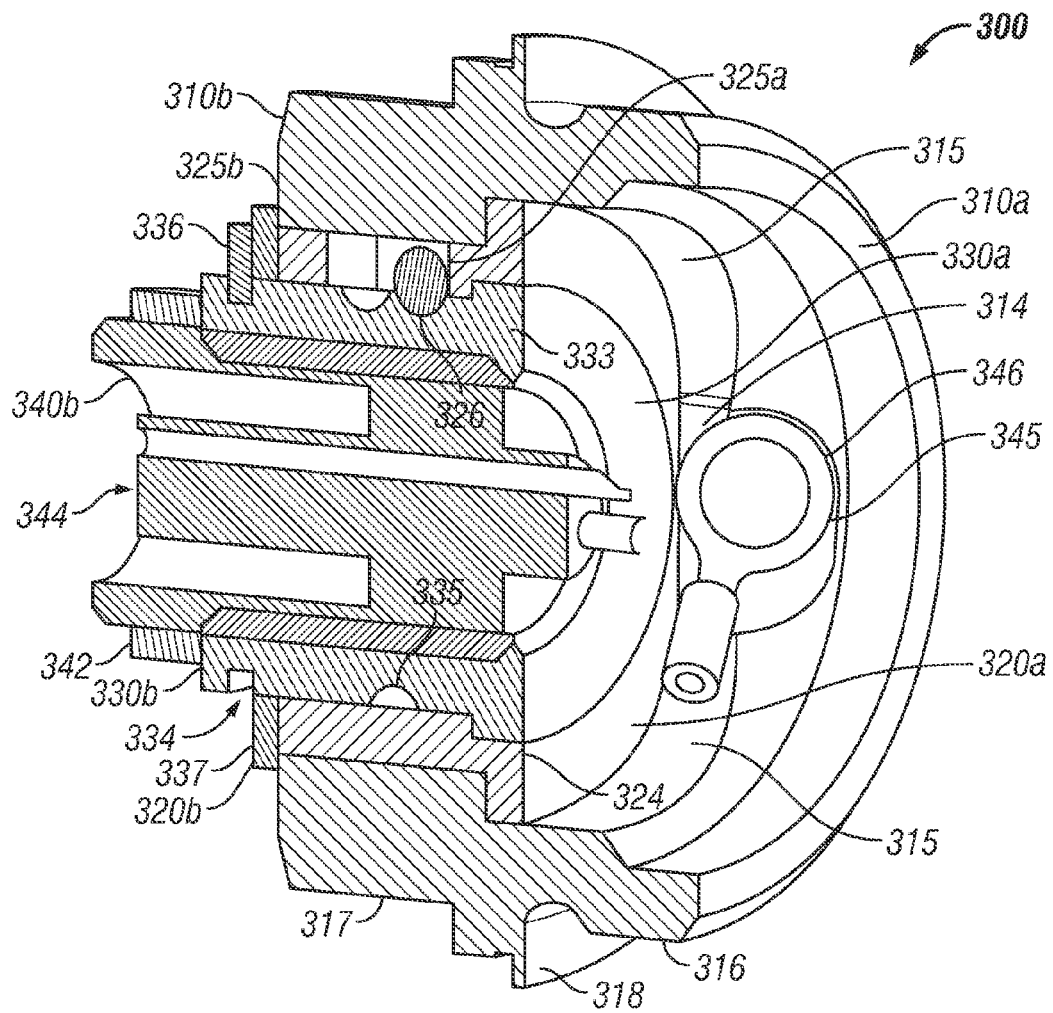
Figure 13:
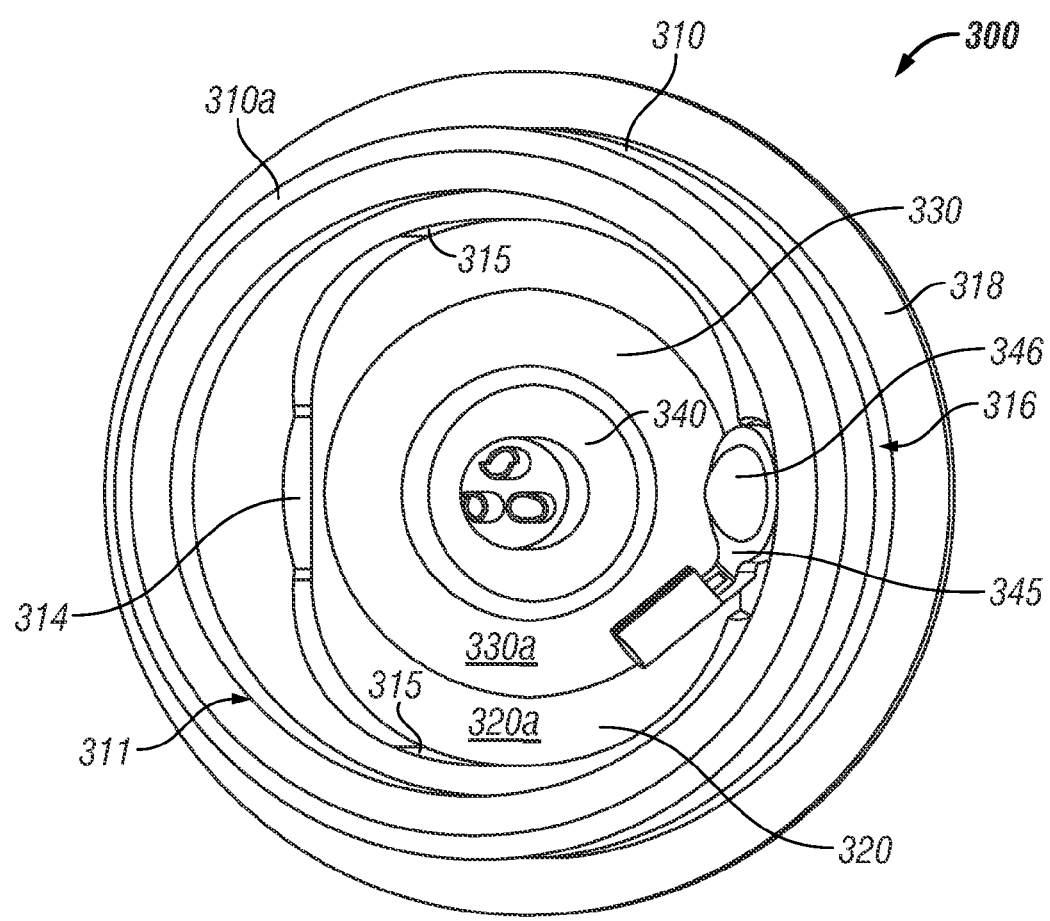
FIG. 13 is a perspective end view of the receptacle capsule of FIG. 2.

Housing 310 has a radially inner (relative to axis 110) or first end 310a, a radially outer (relative to axis 110) or second end 310b, and comprises a throughbore 311 extending axially (relative to axis 205) between ends 310a, b. The radially inner surface of housing 310 (relative to axis 205) defined by throughbore 311 includes an annular shoulder 313 axially disposed (relative to axis 205) between ends 310a, b. In addition, the inner surface of housing 310 includes planar flats 314 angularly spaced 180° apart, and curved or contoured pockets or recesses 315 angularly spaced 180° apart. Each flat 314 is angularly spaced 90° from each pocket 315 such that each flat 314 is circumferentially disposed between the two pockets 315. Flats 314 and pockets 315 each extend axially (relative to axis 205) from shoulder 313 towards first end 310a. As best shown in FIGS. 12 and 13, a wire terminal 345 is electrically coupled to the inner surface of housing 310 within throughbore 311 between one flat 314 and first end 310a. In this embodiment, wire terminal 345 is coupled to housing 310 with a drive screw 346.

Referring still to FIGS. 3 and 10-13, the radially outer surface of housing 310 (relative to axis 205) includes external threads 316 at first end 310a and a plurality of planar flats 317 at second end 310b. In this embodiment, six flats 317 uniformly angularly spaced are provided, thereby defining a hex configuration. In general, flats 317 provide a multiple sets of opposed planar surfaces for engagement and gripping of housing 310 with a wrench, which may be used to rotate housing 310 relative to other components. The radially outer surface of housing 310 also includes a thin annular ring or flange 318 axially disposed (relative to axis 205) between threads 316 and flats 317.

As best shown in FIG. 3, first end 310a of housing 310 is threadingly received by throughbore 271 of spacer 270 at second end 270b. In particular, housing 310 is threadingly advanced into throughbore 271 via mating threads 273, 316 until flange 318 of housing 310 engages or abuts second end 270b of spacer 270. Upon engagement of flange 318 of housing 310 and second end 270b of spacer 270, flange 318 is deformed and bent into engagement with mating notch 274 of spacer 270, thereby restricting and/or preventing the rotation of housing 310 relative to spacer 270. To enable the deformation and bending of flange 318, housing 310 preferably comprise a malleable metal such as aluminum or brass. Further, housing 310 may be nickel plated to enhance corrosion resistance.

Referring again to FIGS. 3 and 10-13, retainer 320 has a radially inner (relative to axis 110) or first end 320a, a radially outer (relative to axis 110) or second end 320b, and comprises a throughbore 321 extending axially (relative to axis 205) between ends 320a, b. The radially inner surface of retainer 320 (relative to axis 205) defined by throughbore 321 includes an annular shoulder 322 axially disposed (relative to axis 205) between ends 320a, b, but proximal first end 320a.

The radially outer surface of retainer 320 (relative to axis 205) includes a plurality of planar flats 323 and a plurality of projections or tabs 324 extending radially outward (relative to axis 205). In this embodiment, two flats 323 angularly spaced 180° apart are provided. Each flat 323 extends completely from first end 320a to second end 320b, and is sized and configured to slidingly engage and mate with one flat 314 of housing 310. Further, in this embodiment, two tabs 324 angularly spaced 180° apart are provided at first end 320a. Each tab 324 is sized and configured to slidingly engage and mate with one pocket 315 of housing 310. As best shown in FIGS.

11 and 12, retainer 320 is coaxially disposed within housing 310. Tabs 324 of retainer 320 are disposed in mating pockets 315 of housing 310, and flats 323 of retainer 320 engaging mating flats 314 of housing 310, thereby forming a keyed engagement that restricts and/or prevents the rotation of retainer 320 relative to housing 310. Further, tabs 324 engage or abut shoulder 313 of housing 310, thereby aiding in the axial positioning (relative to axis 205) of retainer 320 relative to housing 310.

Figure 10:
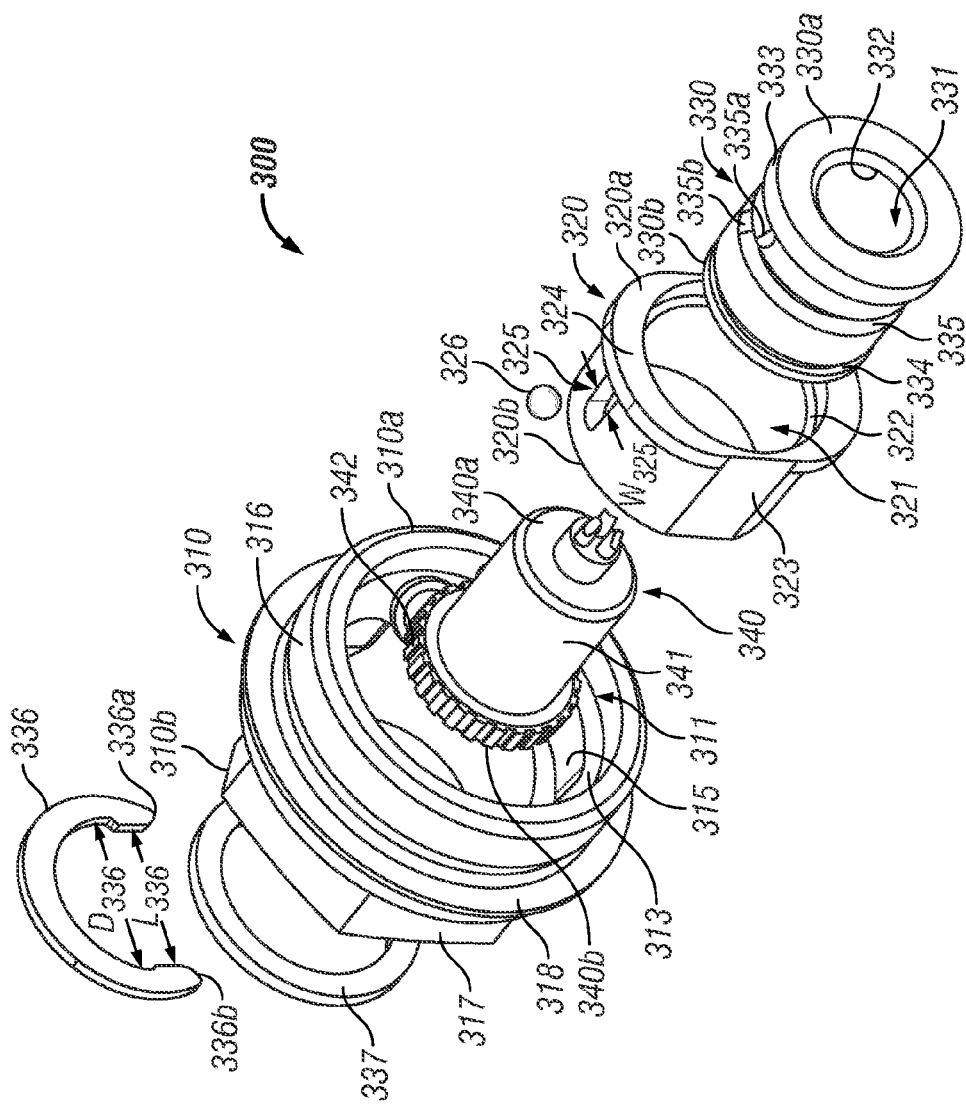
FIG. 10 is an exploded view of the receptacle capsule of FIG. 2.
Figure 11:
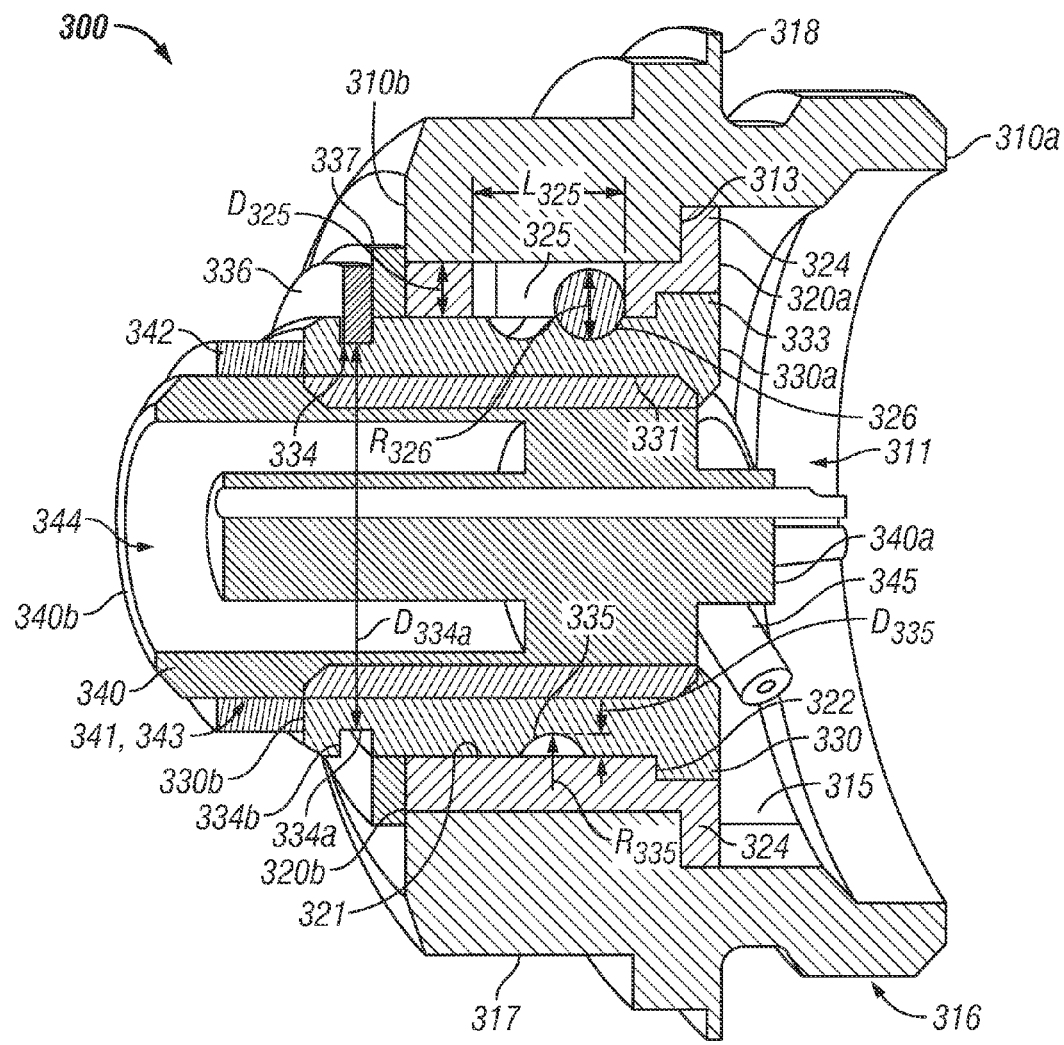
FIGS. 11 and 12 are enlarged cross-sectional views of the receptacle capsule of FIG. 2.

Referring specifically to FIGS. 10-12, retainer 320 also includes a through slot 325 extending radially through retainer 320 (relative to axis 205) from the outer surface to the inner surface of retainer 320. Slot 325 is axially aligned with axis 205 and has a radially inner (relative to axis 205) or first end 325a and a radially outer (relative to axis 205) or second end 325b. As best shown in FIGS. 10 and 11, slot 325 has a length $L_{325}$ measured axially (relative to axis 205) between ends 325a, b, a width $W_{325}$ measured circumferentially between the lateral sides of slot 325, and a depth $D_{325}$ measured radially (relative to axis 205) between the radially outer and inner surfaces of retainer 320. The length $L_{325}$ of slot 325 is greater than its width $W_{325}$, and thus, slot 325 may be referred to as "elongate."

Slot 325 is sized and configured to receive a ball 326 with a radius $R_{326}$. As best shown in FIGS. 10 and 11, length $L_{325}$ of slot 325 is greater than four times radius $R_{326}$ (i.e., greater than twice the diameter of ball 326), width $W_{325}$ of slot 325 is slightly greater than two times radius $R_{326}$ (i.e., slightly greater than the diameter of ball 326), and depth $D_{325}$ of slot 325 is less than two times radius $R_{326}$ (i.e., less than the diameter of ball 326). Thus, ball 326 is free to move axially within slot 325 between ends 325a, b, is restricted from moving circumferentially or laterally relative to slot 325, and extends radially (relative to axis 205) from slot 325.

Referring again to FIGS. 3 and 10-13, holder 330 has a radially inner (relative to axis 110) or first end 330a, a radially outer (relative to axis 110) or second end 330b, and comprises a throughbore 331 extending axially (relative to axis 205) between ends 330a, b. Throughbore 331 is generally cylindrical and includes internal threads 332 extending axially (relative to axis 205) between ends 330a, b. Further, the radially outer surface of holder 330 (relative to axis 205) includes an annular flange 333 at first end 330a, an annular groove or recess 334 at second end 330b, and a spiral groove or recess 335 axially positioned (relative to axis 205) between ends 330a, b.

As best shown in FIGS. 11 and 12, in this embodiment, annular recess 334 is rectangular in cross-section and comprises a cylindrical base 334a generally oriented parallel to axis 205, and a pair of axially spaced (relative to axis 205) lateral annular sidewalls 334b generally perpendicular to axis 205. Each sidewall extends radially outward (relative to axis 205) from base 334a to outer surface of holder 330. Annular recess 334 is sized and configured to mate with a stop or keeper member 336 disposed about holder 330 within recess 334. As shown in FIG. 10, stop member 336 has ends 336a, b and is generally shaped like an open ended ring. Ends 336a, b are angularly spaced more than 180° apart (relative to axis 205). As best shown in FIGS. 10 and 11, stop member 336 has an inner diameter $D_{336}$ that is substantially the same or slightly greater than the diameter $D_{334a}$ of cylindrical base 334a of recess 334. However, as ends 336a, b are angularly spaced more than 180° apart (relative to axis 205), the shortest separation distance $L_{336}$ between ends 336a, b is less than inner diameter $D_{336}$ and less than outer diameter $D_{334a}$. Thus, when stop member 336 is mounted to holder 330 within recess 334, ends 336a, b are pushed or urged apart as holder 330 passes between ends 336a, b, and then snap or spring back to their original orientation and separation distance $L_{336}$ as they move into the lower half of holder 330 and recess 334. Further, in this embodiment, a spacer ring or washer 337 is disposed about holder 330 and axially positioned (relative to axis 205) between stop member 336 and second ends 310b, 320b of housing 310 and retainer 320, respectively. With stop member 336 sufficiently seated in recess 334, ends 336a, b restrict and/or prevent radial movement (relative to axis 205) of stop member 336 relative to holder 330.

As best shown in FIG. 10, spiral groove 335 has a first end 335a, and a second end 335b that is axially spaced (relative to axis 205) from first end 335a. In addition, spiral groove 335 extends circumferentially entirely around holder 330. Specifically, moving along spiral groove 335 from end 335a to end 335b, spiral groove 335 extends through an angular distance greater than or equal 360°. Still further, as best shown in FIGS. 11 and 12, spiral groove 335 is arcuate or curved in cross-section, having a radius of curvature $R_{335}$ and a depth $D_{335}$. The radius of curvature $R_{335}$ of spiral groove 335 is substantially the same or slightly larger than the radius $R_{326}$ of ball 326, and the depth $D_{335}$ of spiral groove 335 is less than the radius $R_{326}$ of ball 326 (i.e., less than half the diameter of ball 326). Thus, groove 335 is sized and configured to receive ball 326. Slot 325 extends axially (relative to axis 205) across spiral groove 335. The length $L_{325}$ of slot 325 is sufficient that slot 325 extends axially (relative to axis 205) over both ends 335a, b of spiral groove 335. Further, ball 326 is disposed in both slot 325 and groove 335. Due to the sizing of ball 326, slot 325 and spiral groove 335, ball 326 is restricted from moving radially (relative to axis 205) out of engagement with slot 325 and groove 335 by the inner surface of housing 310.

Referring again to FIGS. 3 and 10-13, holder 330 is coaxially disposed within retainer 320. In particular, the radially outer surface (relative to axis 205) of holder 330 slidingly engages the radially inner surface of retainer 320 defined by throughbore 321. In other words, holder 330 and retainer 320 are not threadingly coupled together. Holder 330 is restricted from moving axially (relative to axis 205) relative to retainer 320 by stop member 336 and shoulder 322 of retainer 320. Specifically, annular flange 333 of holder 330 engages shoulder 322 of retainer 320, and stop member 336 engages lateral sidewalls 334b of recess 334 and washer 337. However, holder 330 is free to rotate relative to retainer 320 about axis 205. During rotation of holder 330 about axis 205, stop member 336 slidingly engages washer 337 and ball 326 is free to roll within slot 325 and groove 335. As previously described, ball 326 is restricted and/or prevented from disengaging slot 325 and spiral groove 335. Further, rotation of holder 330 relative to retainer 320 is restricted by the engagement of ball 326 with end 335a or end 335b of spiral groove 335. In other words, as holder 330 is rotated in a first direction about axis 205, ball 326 moves in groove 335 until it engages one end 335a, b of groove 335, thereby restricting and/or preventing continued rotation of holder 330 relative to retainer 320 in that first direction. Likewise, as holder 330 is rotated in a second direction opposite to the first direction about axis 205, ball 326 moves in groove 335 until it engages the other end 335a, b of groove 335, thereby restricting and/or preventing continued rotation of holder 330 relative to retainer 320 in that second direction. Since ends 335a, b are angularly spaced more than 360° apart, holder 330 is free to rotate at least 360° about axis 205 from each end 335a, b before engaging the other end 335a, b. Thus, spiral groove 335 is configured to allow for a full 360° of rotation of holder 330 relative to retainer 320, but prevents rotation much beyond 360°.

Receptacle 340 is coaxially disposed within holder 330 and has a radially inner (relative to axis 110) or first end 340a and a radially outer (relative to axis 110) or second end 340b. The radially outer surface (relative to axis 205) of receptacle 340 includes external threads 341 extending between ends 340a, b. A lock nut 342 having internal threads 343 is disposed about holder 330 proximal second end 340b. In particular, lock nut 342 is threadingly coupled to holder 330 via mating threads 341, 343. Still further, second end 340b includes a connector 344 that connects to coupling 290. Connector 344 is electrically coupled to wires (not shown) that extend axially (relative to axis 205) from first end 340a through throughbore 271 of each spacer 270 to transformer 252, thereby electrically coupling and allowing data communication between transformer 252 with electrical coupling 290 and cable 125. In this embodiment, connector 344 is a female coax connector that receives electrical coupling 290.

As best shown in FIGS. 11-13, receptacle 340 is coaxially disposed within holder 330. Specifically, receptacle 340 is threadingly received by throughbore 331, and axially advanced (relative to axis 205) into or out of throughbore 331, via mating threads 332, 341. Lock nut 342 is threaded to receptacle 340 and engages second end 330b of holder 330, thereby restricting and/or preventing relative axial movement (relative to axis 205) between holder 330 and receptacle 340.

Referring now to FIGS. 10-12, receptacle capsule 300 may be assembled by axially inserting (relative to axis 205) first end 340a of receptacle 340 into throughbore 331 at second end 330b of holder 330 and threading receptacle 340 into throughbore 331 via mating threads 332, 341 until ends 330a, 340a are axially (relative to axis 205) aligned or proximal one another. Then, lock nut 342 is threaded onto receptacle 340 from second end 340b until it engages second end 330b, thereby restricting and/or preventing relative axial and rotational movement (relative to axis 205) between holder 330 and receptacle 340. Next, second end 330b of holder 330 (now including receptacle 340) is inserted into throughbore 321 at first end 320a of retainer 320 and axially advanced (relative to axis 205) into retainer 320 until annular flange 333 of holder 330 engages shoulder 322 of retainer 320. Slot 325 in retainer 320 and spiral groove 335 of holder 330 are sized and positioned such that they overlap when flange 333 abuts shoulder 322. Next, ball 326 is disposed in slot 325 with its radially lower portion (relative to axis 205) engaging spiral groove 335. With ball 326 sufficiently positioned in slot 325 and spiral groove 335, tabs 324 and flats 323 of retainer 320 are circumferentially aligned with pockets 315 and flats 314, respectively, of housing 310; and second end 320b of retainer 320 is inserted and axially advanced into throughbore 311 of housing 310 at first end 310a until annular tabs 324 engages shoulder 313. As previously described, engagement of tabs 324 with pockets 315, and flats 323 with flats 314, retainer 320 and housing 310 are restricted and/or prevented from rotating (about axis 205) relative to each other. Further, as previously described, with housing 310 disposed about retainer 320 and holder 330, ball 326 is restricted and/or prevented from disengaging slot 325 and spiral groove 335 by the radially inner surface (relative to axis 205) of housing 310. Next, second ends 340b, 330b of receptacle 340 and holder 330, respectively, are inserted into washer 337, and washer 337 is axially advanced (relative to axis 205) over receptacle 340 and holder 330 until it engages second ends 320b, 310b of retainer 320 and housing 310, respectively. With washer 337 properly positioned, stop member 336 is disposed about holder 330 within recess 334, thereby restricting and/or preventing relative axial movement (relative to axis 205) between holder 330, retainer 320, and housing 310. However, as previously described, holder 330, and hence receptacle 340, are permitted to rotate relative to retainer 320 as permitted by the engagement of ball 326 and spiral groove 335.

Referring now to FIG. 3, electrical coupling 290 includes a first end 290a connected to receptacle 340 and a second end 290b connected to cable 125. In this embodiment, coupling 290 is a 90° push-pull plug, with ends 290a, b generally oriented 90° apart. Further, in this embodiment, first end 290a is a male coax connector that mates with female coax connector 344. Thus, coupling 290 electrically couples cable 125 with receptacle 340 and transducer assembly 200, thereby enabling the communication of data therebetween. Cable 125 extends from second end 290b of electrical coupling 290 to electronics package 40, which receives data from all the gas ultrasonic transducer assemblies and calculates the fluid flow rate within bore 130 of spool piece 105.

As best shown in FIG. 3, 90° push-pull plug coupling 290 is preferably positioned and oriented such that first end 290a extends axially (relative to axis 166) into bore 165 proximal receptacle 344, and second end 290b extends radially (relative to axis 166) upward within pocket 175 of boss 135. In particular, first end 290a preferably extends axially (relative to axis 166) into bore 165 proximal receptacle 344 to allow first end 290a to be inserted into mating coax receptacle 344. Further, second end 290b preferably extends radially (relative to axis 166) upward within pocket 175 of boss 135 such that (a) cable 125 and coupling 290 are shielded and protected by cover 120, and (b) cable 125 extends upward towards the electronics package 40 disposed on the top of spool piece 105. As previously described, holder 330 and receptacle 340 may be rotated a full 360° relative to retainer 320, thereby enabling rotation of push-pull plug coupled 290 through a full 360° to ensure proper alignment of second end 290b within pocket 175. However, rotation of receptacle 340 and retainer 320 are limited by engagement of spiral groove ends 335a, b and ball 326, and thus, over rotation of push-pull plug coupling 290 and undesirable over twisting of cable 125 is restricted and/or prevent.

Referring now to FIGS. 3, 4, and 10-12, the order in which the various components of transducer assembly 200 are assembled may be varied. However, transducer assembly 200 is preferably assembled prior to insertion into port 165, and further, a first subassembly including transformer capsule 250, spacers 270, and receptacle capsule 300 is preferably assembled prior to coupling transformer capsule 250 to transducer holder 230. Moreover, piezoelectric capsule 210 may be coupled to transducer holder 230 before or after the first subassembly (including transformer capsule 250, spacers 270, and receptacle capsule 300) is coupled to transducer holder 230. However, sealed electrical coupling 235 is disposed (relative to axis 205) in throughbore 236 of transducer holder 230 before both piezoelectric capsule 210 and the subassembly (including transformer capsule 250, spacers 270, and receptacle capsule 300) are threadingly coupled to transducer holder 230.

An exemplary method for assembling gas transducer assembly 200 will now be described with reference to FIGS. 3, 4, and 10-12. The first subassembly including transformer capsule 250, spacers 270, and receptacle capsule 300 may be assembled by coupling transformer capsule 250, spacers 270, and receptacle capsule 300 in any particular order. In the exemplary assembly method to follow, these components will be assembled in order moving from right to left as shown in FIG. 3. The pair of transformer secondary wires (not shown) having ends connected to circuit board 255 of transformer capsule 250 are axially (relative to axis 205) fed into and completely though throughbore 271 of first spacer 270. First spacer 270 is then coupled to transformer capsule 250 by axially inserting (relative to axis 205) first end 270a of first spacer 270 into counterbore 254 of transformer capsule 250 and threading first end 270a into counterbore 254 via mating threads 261, 272 until flange 276 engages second end 250b of transformer capsule 250. Flats 275 on second end 270b of first spacer 270, and flats 259 on first end 250a of transformer capsule 250 may be used to rotate first spacer 270 relative to transformer capsule 250. With first end 270a of first spacer 270 sufficiently positioned in counterbore 254, flange 276 is deformed and bent into notch 257 of transformer capsule 250, thereby restricting and/or preventing rotation (and further threading or unthreading) of first spacer 270 relative to transformer capsule 250. The pair of transformer secondary wires (not shown) having ends connected to circuit board 255 of transformer capsule 250 and extending through throughbore 271 of first spacer 270 are then axially (relative to axis 205) fed into and completely though throughbore 271 of second spacer 270. Next, second spacer 270 is coupled to first spacer 270 by axially inserting (relative to axis 205) first end 270a of second spacer 270 into throughbore 271 of first spacer 270 at second end 270b, and threading first end 270a of second spacer 270 into throughbore 271 of first spacer 270 via mating threads 272, 273 until flange 276 of second spacer 270 engages second end 270b of first spacer 270. Flats 275 on second end 270b of second spacer 270, and flats 275 on second end 270b of first spacer 270 (or flats 259 on first end 250a of transformer capsule 250) may be used to rotate second spacer 270 relative to first spacer 270 and transformer capsule 250. With first end 270a of second spacer 270 sufficiently positioned in throughbore 271 of first spacer 270, flange 276 of second spacer 270 is deformed and bent into notch 274 of first spacer 270, thereby restricting and/or preventing rotation (and further threading or unthreading) of second spacer 270 relative to first spacer 270 and transformer capsule 250.

One end of a grounding wire (not shown) is crimped to wire terminal 345, which is secured to housing 310 with drive screw 346. The other end of the grounding wire (not shown) is soldered to a first pin (e.g., pin 1) extending from first end 340a of receptacle 340. Further, the pair of transformer secondary wires (not shown) having ends connected to circuit board 255 of transformer capsule 250 and extending through throughbores 271 of first spacer 270 and second spacer 270 are soldered to the second and third pins (e.g., pins 2 and 3), respectively, extending from first end 340a of receptacle 340.

Next, receptacle capsule 300 is coupled to second spacer 270 by axially inserting (relative to axis 205) first end 310a of housing 310 into throughbore 271 of second spacer 270 at second end 270b, and threading first end 310a of housing 310 into throughbore 271 of second spacer 270 via mating threads 273, 316 until flange 318 of housing 310 engages second end 270b of second spacer 270. Flats 317 on second end 310b of housing 310 and flats 275 on second end 270b of second spacer 270 (or flats 275 on second end 270b of first spacer 270 or flats 259 on first end 250a of transformer capsule 250) may be used to rotate housing 310 relative to second spacer 270, first spacer 270, and transformer capsule 250. With first end 310a of housing 310 sufficiently positioned in throughbore 271 of second spacer 270, flange 318 of housing 310 is deformed and bent into notch 274 of second spacer 270, thereby restricting and/or preventing rotation (and further threading or unthreading) of housing 310 relative to second spacer 270, first spacer 270, and transformer capsule 250.

Once assembled, the first subassembly including receptacle capsule 300, spacers 270, and transformer capsule 250 may be coupled to transducer holder 230 by axially inserted (relative to axis 205) inserting first end 251a of transformer capsule 250 into counterbore 233 of transducer holder 230 and threading transformer capsule 250 into counterbore 233 via mating threads 234, 258 until transformer capsule 250 is sufficiently seated in counterbore 233. Before or after the first subassembly is coupled to transducer holder 230, piezoelectric capsule 210 may be coupled to transducer holder 230. Piezoelectric capsule 210 is coupled to transducer holder 230 by axially inserting (relative to axis 205) second end 210b of piezoelectric capsule 210 into counterbore 231 of transducer holder 230 and threading second end 210b into counterbore 231 via mating threads 221, 232 until second end 210b is sufficiently seated in counterbore 231. As noted above, sealed electrical coupling 235 is positioned in throughbore 236 of transducer holder 230 before both the first subassembly and piezoelectric capsule 210 are threaded into counterbores 233, 231, respectively. Transformer capsule 250 and piezoelectric capsule 210 are preferably seated in counterbores 233, 231, respectively, such that male coax connectors 235a, b of sealed electrical coupling 235 sufficiently engage mating electrical connectors 216, 253, respectively, of piezoelectric capsule 210 and transformer capsule 250, respectively.

Figure 14:
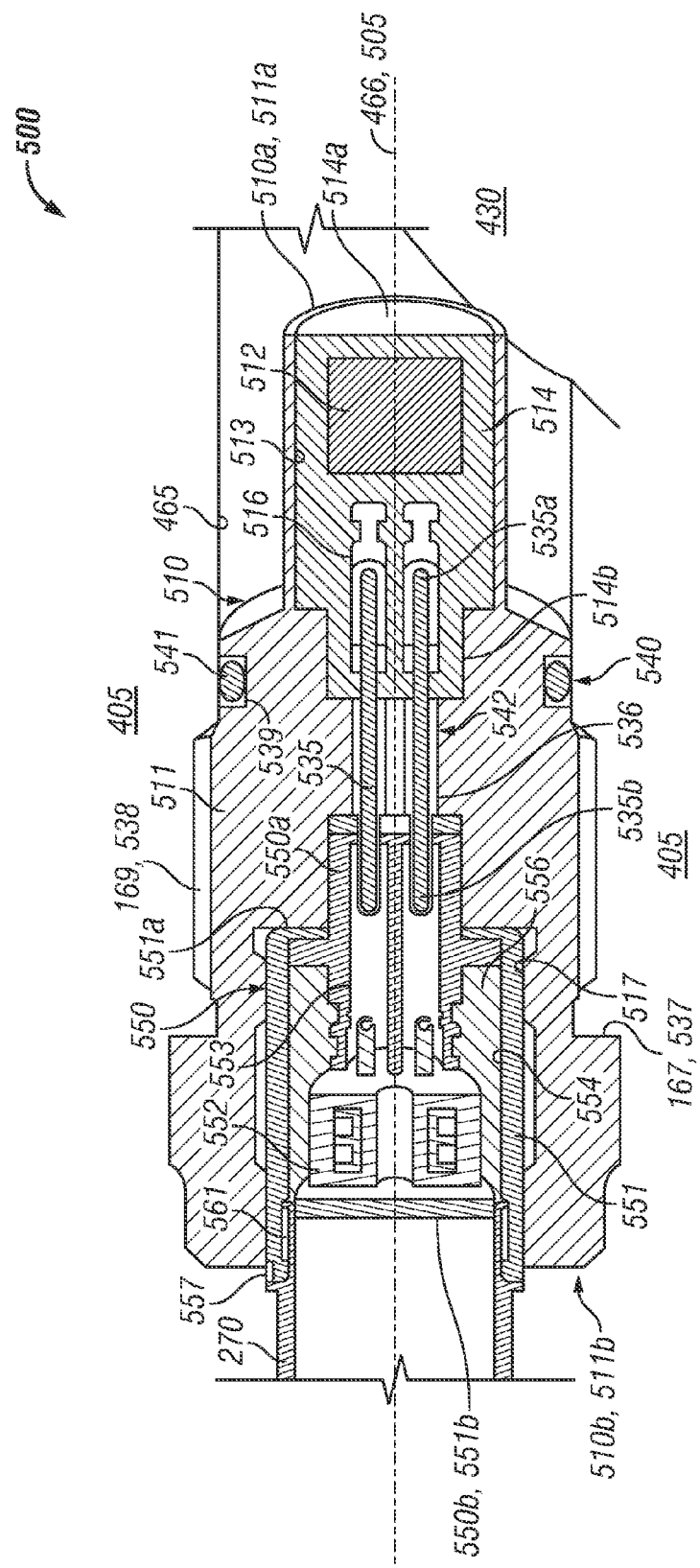
FIG. 14 is a partial cross-sectional view of an embodiment of a gas ultrasonic transducer assembly disposed in one of the transducer ports of the ultrasonic flow meter of FIG. 2.

Referring now to FIG. 14, an embodiment of a gas ultrasonic transducer assembly 500 is shown coaxially disposed in a port 465 of a spool piece 405 that are substantially the same as port 165 and spool piece 105, respectively, previously described. Transducer assembly 500 has a central or longitudinal axis 505 that is generally coincident with central axis 466 of port 465 when transducer assembly 500 is coupled to spool piece 405 within port 465. Transducer assembly 500 is similar to transducer assembly 200 previously described. Namely, transducer assembly 500 includes a transformer capsule 550 that is sealingly isolated from the fluids flowing in throughbore 430 of spool piece 405 and the pressures within throughbore 430. However, in this embodiment, the transducer holder and the piezoelectric capsule are essentially merged into one integral structure, and further, a pinned coupling (as opposed to a coax coupling) is employed to electrically couple the transformer and piezoelectric element.

Moving outward from throughbore 430 of spool piece 405, transducer assembly 500 comprises a piezoelectric capsule 510 and transformer capsule 550. One or more transformer capsule spacers 270, receptacle capsule 300 (not shown), and electrical coupling 290 (not shown) as previously described may be coupled to transformer capsule 550. Piezoelectric capsule 510 and transformer capsule 550 (as well as any transformer capsule spacers 270, receptacle capsule 300, and electrical coupling 290) are axially coupled end-to-end and coaxially oriented relative to axes 466, 505. For purposes of simplicity, axes 466, 505 are used herein to define axial positions of various features and components of transducer assembly 500, it being understood that each individual component has a central axis generally coincident with axis 505 when assembled into transducer assembly 500, and generally coincident with axis 466 when installed in port 465.

Figure 15:
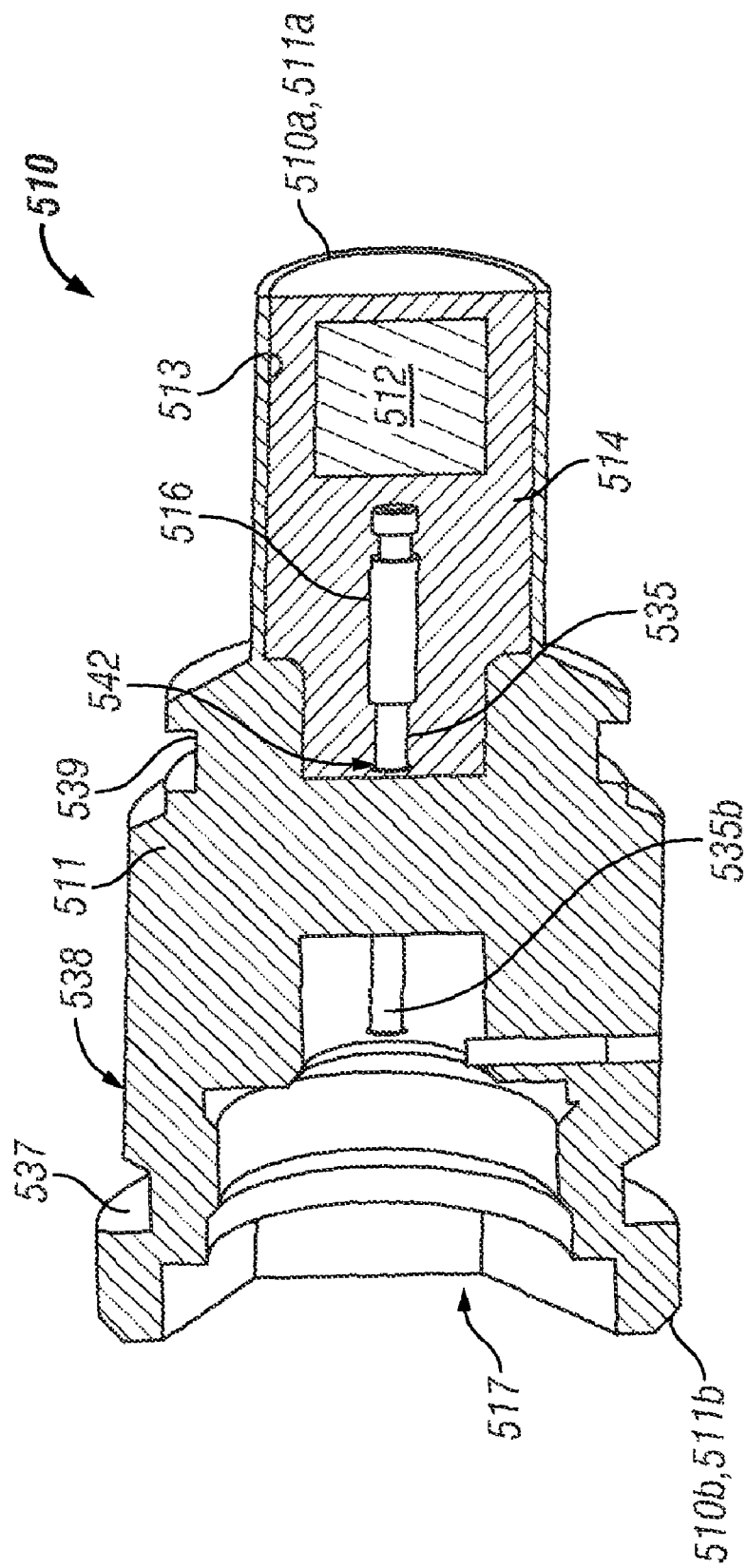
FIG. 15 is an enlarged cross-sectional view of the piezoelectric capsule of FIG. 14.
Figure 16:
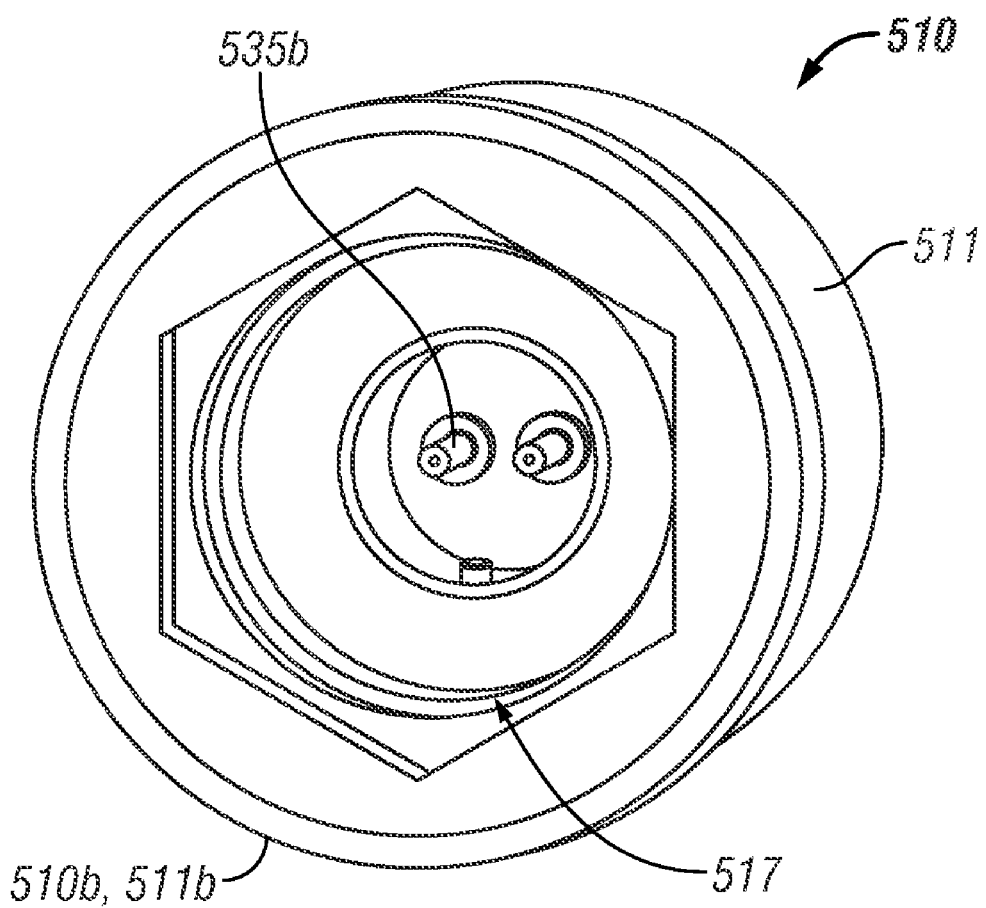
FIG. 16 is an end view of the piezoelectric capsule of FIG. 14.

Referring now to FIGS. 14-16, piezoelectric capsule 510 has a radially inner (relative to axis 110) or first end 510a, a radially outer (relative to axis 110) or second end 510b, and comprises a body or housing 511, a piezoelectric element 512, and a matching layer 514. Housing 511 extends axially (relative to axis 505) between ends 510a, b, and thus, may also be described as having first and second ends 511a, b, respectively, coincident with ends 510a, b. First ends 510a, 511a of piezoelectric capsule 510 and housing 511, respectively, extend axially (relative to axes 466, 505) to throughbore 430 and are exposed to the fluid flowing within throughbore 430. In addition, first end 511a of housing 511 includes a counterbore 513 that extends axially (relative to axis 505) from end 511a, and second end 511b of housing 511 includes a counterbore 517 that extends axially (relative to axis 505) from end 511b. Two throughbores 536 extend axially through housing 511 between counterbores 513, 517. One electrical coupling 535 is coaxially disposed in each throughbore 536; couplings 535 have ends 535a, b. In this embodiment, each electrical coupling 535 is an elongate pin extending through one of throughbores 536. An annular seal 542 is provided between each coupling 535 and housing 511, thereby restricting and/or preventing the axial flow of fluids (relative to axis 505) between coupling 535 and housing 511. Seal 542 formed between coupling 535 and housing 511 is preferably sufficient to withstand the expected fluid pressures in bore 430, which are typically greater than ambient. In this embodiment, each seal 542 is a glass seal.

Piezoelectric element 512 is positioned in counterbore 513 proximal first end 511a and bore 430, and is surrounded by or encased in matching layer 514. Similar to piezoelectric element 212 previously described, piezoelectric element 512 is a piezoelectric material that produces an electrical potential in response to applied mechanical stress, and produces a mechanical stress and/or strain in response to an applied electric field. In general, piezoelectric element 512 may comprises any suitable piezoelectric material such as a piezoelectric crystal or ceramic. However, in this embodiment, piezoelectric element 512 is a piezoelectric crystal.

Matching layer 514 generally fills counterbore 513 and surrounds piezoelectric element 512. Once installed in counterbore 513, matching layer 514 extends axially (relative to axis 505) from a radially inner (relative to axis 110) or first end 514a proximal bore 430 (coincident with end 510a) and a radially outer (relative to axis 110) or second end 514b distal bore 430 and adjacent throughbores 536. In this embodiment, a pair of sockets or receptacles 516 are disposed in matching layer 514, each socket 516 generally aligned with one of throughbores 536 and couplings 535. Specifically, in this embodiment, each socket 516 is a female plug receptacle that receives end 535a of one of couplings 535. Two leads or wires (not shown) electrically couple piezoelectric element 512 to plug sockets 516. Plug sockets 516 are rigidly held in place relative to housing 511 by matching layer 514, which generally fills counterbore 513 and surrounds piezoelectric element 512.

Referring still to FIGS. 14-16, matching layer 514, and piezoelectric element 512, are coupled to housing 511 within counterbore 513. In this embodiment, matching layer 514 is directly connected to the inner cylindrical surface of counterbore 513 of housing 511. The matching layer (e.g., matching layer 514) may comprise any suitable material such as plastic, metal, glass, ceramic, epoxy, powder-filled epoxy, rubber, or powder-filled rubber. In this embodiment, matching layer 514 comprises epoxy that is injected into counterbore 514 and around and over piezoelectric element 512, two leads or wires (not shown) that electrically couple piezoelectric element 512 to plug sockets 516, each socket 516 and each couplings 535. Regardless of the material of the matching layer (e.g., matching layer 514), the matching layer provides acoustical coupling between the piezoelectric element (e.g., piezoelectric element 512) and fluid flowing through the meter. In accordance with certain embodiments disclosed herein, the acoustic matching layer has an acoustic impedance between that of the piezoelectric element and fluid within the meter. With the acoustic impedance of the matching layer between that of the piezoelectric element and the fluid in the meter, the quality of the ultrasonic signal is improved (e.g., larger amplitude and faster rise time).

Referring to FIGS. 14 and 15, the radially outer surface of housing 511 (relative to axis 505) includes an annular shoulder 537 proximal second end 510b, external threads 538 positioned between shoulder 537 and inner end 510a, and an annular recess or groove 539 axially positioned (relative to axis 505) between external threads 538 and inner end 510a. An annular seal 541 is disposed in groove 539. Together, groove 539 and seal 541 disposed therein define a seal assembly 540 positioned radially (relative to axis 505) between piezoelectric capsule 510 and spool piece 405. Seal assembly 540 forms an annular seal between piezoelectric capsule 510 and spool piece 405, thereby restricting and/or preventing the flow of fluid (e.g., fluid flowing in bore 430) between piezoelectric capsule 510 and spool piece 405. In this embodiment, annular seal 541 is an elastomeric O-ring seal that is radially compressed between spool piece 405 and piezoelectric capsule 510 upon assembly.

As previously described, seal assembly 540 restricts and/or prevents the flow of fluid (e.g., fluid flowing in bore 430) between piezoelectric capsule 510 and spool piece 405, and annular seals 542 restrict and/or prevent the axial flow of fluids (relative to axis 505) between each coupling 535 and housing 511. Seal assembly 540 and seal 542 work together to restrict and/or prevent potentially hazardous, contaminating, or corrosive fluids in bore 430 from escaping bore 430 via port 465. Seal assembly 540 and annular seal 542 also function to maintain the pressure differential between ambient conditions external spool piece 405 and the pressurized fluid flowing in bore 430. Thus, although piezoelectric capsule 510 is exposed to the fluid and pressures within bore 430, transformer capsule 550 (as well as any spacers 270 and receptacle capsule 300 coupled thereto) are isolated from the fluid and pressure within bore 430.

Piezoelectric capsule 510 and transducer assembly 500 are threadingly coupled to spool piece 405 via mating threads 169, 538, and annular shoulder 537 of housing 511 engages annular shoulder 167 of port 465. During assembly, piezoelectric capsule 510 is threaded and axially advanced into port 465 until shoulders 167, 537 engage, thereby preventing continued axial advancement of piezoelectric capsule 510 (and transducer assembly 500) into port 465. Thus, shoulder 167 in port 465 defines the axial position of piezoelectric capsule 510 (and transducer assembly 500) within port 465.

Referring now to FIG. 14, transformer capsule 550 has a radially inner (relative to axis 110) or first end 550a, a radially outer (relative to axis 110) or second end 550b, and includes a body or housing 551, a transformer 552, and a pair of female plug sockets or receptacles 553. Housing 551 extends axially (relative to axis 505) from a radially outer (relative to axis 110) or first end 551b coincident with end 550b to a radially inner (relative to axis 110) or second end 551a proximal end 550a. In addition, housing 551 includes a throughbore 554 extending between ends 551a, b.

Each female plug socket 553 is disposed at first end 550a of transformer capsule 550 and is coupled to first end 551a of housing 551. Each female plug socket 553 is electrically coupled transformer 552. In general, the transformer (e.g., transformer 552) matches the impedance of the piezoelectric element (e.g., piezoelectric element 512) to the system electronics. Female plug sockets 553 and transformer 552 are rigidly held in place relative to housing 551 within throughbore 554 by a fill material 556 that fills the remainder of throughbore 554. In general, the fill material (e.g., fill material 256) may comprise any suitable material such as plastic, epoxy, or ceramic. Fill material 556 creates an adhesive bond between the transformer 552, wire leads (not shown) of the transformer 552, and female plug sockets 553 to rigidly hold these components in position. In this embodiment, filler 556 is a rigid epoxy.

Similar to housing 251 previously described, the radially outer (relative to axis 505) surface of housing 551 includes a notch or recess 557 at second end 551b. The radially inner (relative to axis 205) surface of housing 551 includes internal threads 561 at second end 551b.

As best shown in FIG. 14 and previously described, couplings 535 extend axially through throughbores 536 between piezoelectric capsule 510 and transformer capsule 550. Ends 535a, b of each coupling engage and mate with plug sockets 516, 553, respectively, thereby electrically coupling piezoelectric element 512 and transformer 552.

Many conventional gas ultrasonic transducers use straight chordset connections that protrude axially (relative to the port central axis) from the spool piece, and then are curved upward to direct the chordset cables towards the electronics package. To avoid potential damage to the chordset by crimping or kinking the wires therein, most such chordsets are configured with a relative large radius of curvature as compared to a 90° push-pull plug coupling. Consequently, most such conventional chordset connections extend further from the spool piece body as compared to embodiments described herein. Due to the greater extension from the spool piece body, most conventional chordset connections occupy more space, may be more difficult to cover and protect, and may be more susceptible to damage (e.g., during shipping, by being chewed or bumped by animals, etc.) as compared to embodiments described herein.

The use of a 90° push-pull plug coupling (e.g., 90° push-pull plug coupling 290) in embodiments described herein to electrically couple a gas ultrasonic transducer (e.g., gas ultrasonic transducer assembly 200) to the electronics package offers the potential to enhance protection of the cable (e.g., cable 125) extending between the gas ultrasonic transducer and the electronics package. Specifically, a 90° push-pull plug coupling provides a relatively short radius turn between the transducer assembly disposed within the spool piece and the cable extending along the outside of the spool piece to the electronics package, thereby allowing the cables to be positioned tightly or very close against the spool piece body within the cable boss (e.g., boss 135) and associated pocket (e.g., pocket 175).

It should be appreciated that simply replacing the conventional straight chordset connection with a 90° elbow plug chordset connection may not sufficiently address the shortcomings of most conventional straight chordset connections. For example, such a modification may result in undesirable cable routing because there is limited control over the rotational orientation of the 90° elbow plug chordset connection upon installation. Specifically, most conventional chordset connections (straight or otherwise) employ two sockets that mate with two pins extending from the transducer assembly receptacle. It is important that each of the pins connects to a particular socket in the chordset connection. To achieve the correct connection, the transducer assembly receptacle is typically keyed to the chordset connection. Consequently, the orientation of the transducer assembly and the transducer assembly receptacle (and its two pins) dictate the orientation of the mating chordset connection. Further, most conventional gas ultrasonic transducers are rotationally coupled to the spool piece by threading the transducer into a mating port in the spool piece until the transducer assembly bottoms out and the piezoelectric element are properly positioned. Consequently, the rotational orientation of the transducer assembly relative to the spool piece port, and hence, the rotational orientation of receptacle pins and 90° elbow plug chordset connection relative to the spool piece port, is difficult to predict and may vary from port to port upon installation in the field. Thus, in many instances the 90° elbow plug chordset connection may not be oriented such that its distal end extends upward toward the electronics package. In those cases where the 90° elbow plug chordset connection does not extend upward toward the electronics package, the chordset protrusion from the spool piece resulting from bending and routing the chordset cables upward toward the electronics package may be greater than a conventional straight chordset connection. However, embodiments described herein that include receptacle (e.g., receptacle 340) that is free to rotate relative to the remainder of the transducer assembly (e.g., transducer assembly) allows the 90° push-pull plug coupling (e.g., 90° push-pull plug coupling 290) to be rotated following installation of the transducer assembly into its mating port (e.g., port 165), thereby offering the potential for optimal orientation and routing of the cables (e.g., cables 125) on a relatively straight path from the transducer assembly to the electronics package, regardless of the rotational orientation of the transducer assembly (e.g., transducer assembly 200) relative to the spool piece port.

Moreover, simply replacing the conventional straight chordset connection with a 90° elbow plug chordset connection may not be a viable option if the transducer assembly does not extend to the exterior of the spool piece. In particular, if the transducer assembly does not extend to the exterior of the spool piece (i.e., the length of the spool piece port is greater than the length of the transducer assembly), the 90° elbow plug chordset connection may not be able to reach and engage a transducer assembly. Most transducer ports are arranged in sets of two horizontally extending ports that are vertically spaced apart in the spool piece. Taking into account the curvature of the spool piece, each port within a given set often has a different length. For example, a first horizontal port with a central axis that intersects the central axis of the spool piece bore is shorter than a second horizontal port that is parallel to the first port and vertically spaced above the first port. Thus, a gas ultrasonic transducer that extends through the first horizontal port from the spool piece bore to the outer surface of the spool piece may not extend from the spool piece bore to the outer surface of the spool piece when disposed in the second horizontal port. This is one reason why straight chordsets are conventionally employed, to account for variations in port length. However, embodiments described herein offer the potential to adjust the overall length of the transducer assembly (e.g., transducer assembly 200) by use of spacers (e.g., spacers 270) in order to achieve appropriate positioning of the 90° push-pull plug receptacle (e.g., receptacle 340) proximal the boss (e.g., boss 135).

In embodiments described herein, the spacers (e.g., spacers 270) may be used to adjust the overall length of the transducer assembly such that it extends from the bore of the spool piece (e.g., bore 130) to the cable boss (e.g., boss 135), thereby enabling sufficient positioning of the receptacle (e.g., receptacle 340) proximal the cable boss (e.g., boss 135). In general, any suitable number of spacers and/or length of spacers may be employed to achieve the desired transducer assembly length. The number and length of spacers are preferably chosen such that the receptacle is axially positioned (relative to the central axis of the assembly) within 0.25 inches of the boss.

Figure 17:
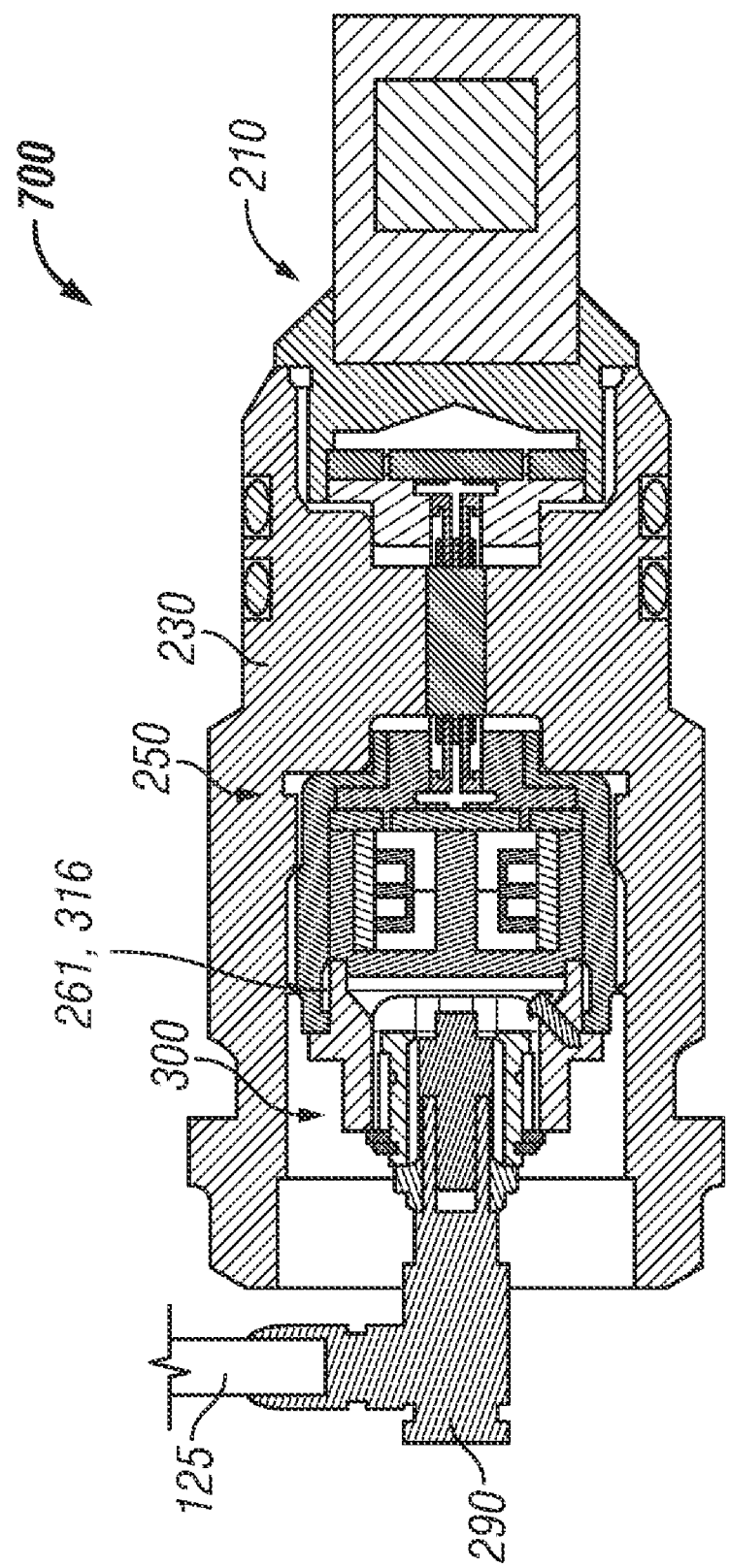
FIG. 17 is a cross-sectional view of an embodiment of an ultrasonic flow meter in accordance with the principles described herein.
Figure 18:
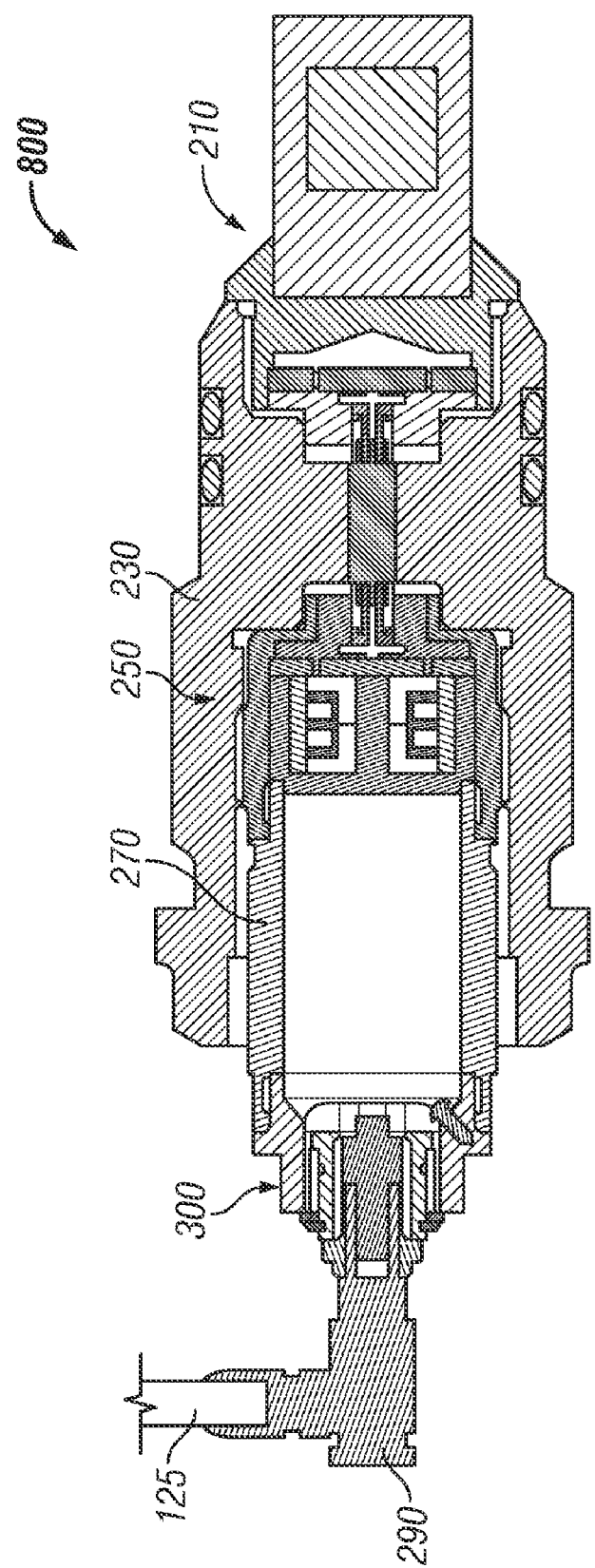
FIG. 18 is a cross-sectional view of an embodiment of an ultrasonic flow meter in accordance with the principles described herein.

Referring now to FIGS. 17 and 18, different embodiments of gas ultrasonic transducer assemblies 700, 800, respectively, in accordance with the principles described herein are shown. Assemblies 700, 800 are each substantially the same as transducer assembly 200 previously described except for the number and length of the spacers. In FIG. 17, transducer assembly 700 includes a piezoelectric capsule 210, a transducer holder 230, a transformer capsule 250, a receptacle capsule 300, and a 90° push-pull electrical coupling 290 as previously described. However, in this embodiment, transducer assembly 700 does not include a transformer spacer (e.g., spacer 270). Rather, receptacle capsule 700 is directly connected to transformer capsule 250. Receptacle capsule 300 is coupled to transformer capsule 250 by axially inserting (relative to axis 205) first end 310a of housing 310 into counterbore 254 of transformer capsule 250 and threading first end 310a into counterbore 254 via mating threads 261, 316 until flange 318 of housing 310 engages second end 250b of transformer capsule 250. Flats 317 of receptacle capsule 300 and flats 259 of transformer capsule 250 may be used to rotate receptacle capsule 300 relative to transformer capsule 250. With first end 310a of housing 310 sufficiently positioned in counterbore 254, flange 318 is deformed and bent into notch 257 of transformer capsule 250, thereby restricting and/or preventing rotation (and further threading or unthreading) of housing 310 relative to transformer capsule 250. Once receptacle capsule 300 is coupled to transformer capsule 250, they may be coupled to transducer holder 230, port 165, and spool piece 405 as previously described. As the embodiment of transducer assembly 700 shown in FIG. 17 includes no spacer, it is generally configured for relatively short ports in the spool piece.

Referring now to FIG. 18, transducer assembly 800 includes a piezoelectric capsule 210, a transducer holder 230, a transformer capsule 250, a receptacle capsule 300, and a 90° push-pull electrical coupling 290 as previously described. However, in this embodiment, transducer assembly 800 includes only one transformer spacer 270. Receptacle capsule 300 and transformer capsule 250 are coupled to spacer 270 as previously described. Further, once receptacle capsule 300, spacer 270, and transformer capsule 250 are coupled together, they may be coupled to transducer holder 230, port 165, and spool piece 405 as previously described. As the embodiment of transducer assembly 800 shown in FIG. 15 includes only one spacer 270, it is generally configured for a medium length port.

As previously described, the number and length of spacers are preferably chosen such that the receptacle is axially positioned (relative to the central axis of the assembly) within 0.25 inches of the boss. By using spacers (e.g., spacers 270) having different lengths, the overall length of the transducer assembly may be varied as desired. To reduce and/or minimize the number of different length spacers (e.g., for inventory carrying purposes), the spacers may be manufactured in two or three different lengths so the spacers can be assembled in different combinations to achieve the overall desired length transducer assembly.

In embodiments described herein, the components of the transducer assembly (e.g., transducer assembly 200) that must be exposed to the flowing fluid in the bore (e.g., bore 130) of the spool piece are axially spaced and sealingly isolated from the components of the transducer assembly that do not need to be exposed to the flowing fluid in the bore or the associated pressure. For example, as best shown in FIGS. 3 and 4, piezoelectric capsule 210 is exposed to the fluid in bore 130, while transformer capsule 250, spacers 270, and receptacle capsule 300 are axially spaced from piezoelectric capsule 210 (relative to axis 205) and sealingly isolated from piezoelectric capsule 210 by seal assembly 227, seal assemblies 240, and seal 242. In general, the sealed isolation of those components that do not need to be exposed to the flowing fluid in the spool piece bore from the flowing fluid (and from those components that must be exposed to the flowing fluid) offers the potential to enhance the life of the transducer assembly. Specifically, restricting and/or preventing select components from exposure to the flowing fluids reduces exposure to corrosive, hazardous, and/or contaminating substances in the flowing fluid, and reduces exposure to the pressures experienced in the bore of the spool piece, both of which may prematurely damage the components over time.

Moreover, axially spacing and sealingly isolating the components of the transducer assembly that must be exposed to the flowing fluid from the components of the transducer assembly that do not need to be exposed to the flowing fluid in the bore offers the potential for improved serviceability and maintenance. In particular, the components isolated from the flowing fluid and associated pressures may be removed and replaced without removing the entire transducer assembly and piezoelectric element. In addition, removal of the components isolated from the flowing fluid does not require cessation of the flow of fluid in the bore of the spool piece. For example, as best shown in FIGS. 3 and 4, receptacle capsule 300, spacers 270, transformer capsule 250, or combinations thereof may be decoupled from transducer holder 230 and removed from port 165 without removing piezoelectric capsule 210. Further, since seal assemblies 227, 240 and sealed electrical coupling 235 restrict and/or prevent fluid flow from bore 130 through port 165, fluid flow through bore 130 does not need to be interrupted to remove and replace receptacle capsule 300, spacers 270, transformer capsule 250, or combinations thereof.

While preferred embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the invention. For example, the relative dimensions of various parts, the materials from which the various parts are made, and other parameters can be varied. Accordingly, the scope of protection is not limited to the embodiments described herein, but is only limited by the claims that follow, the scope of which shall include all equivalents of the subject matter of the claims.

What is claimed is:

1. An ultrasonic flow meter for measuring the flow of a fluid through a pipeline, comprising:
   a spool piece including a throughbore and a transducer port extending from the outer surface of the spool piece to the throughbore;
   a transducer assembly disposed in the transducer port, wherein the transducer assembly has a central axis and comprises:
      a transducer holder having a first end proximal the throughbore of the spool piece, and a second end distal the throughbore of the spool piece;
      a piezoelectric capsule including a piezoelectric element, wherein the piezoelectric capsule is coupled to the transducer holder and extends generally axially from the first end of the transducer holder;
      a transformer capsule including a transformer, wherein the transformer capsule is coupled to the transducer holder and is axially spaced apart from the piezoelectric capsule.

2. The flow meter of claim 1, wherein the first end of the transducer holder includes a first axial counterbore and the second end of the transducer holder includes a second axial counterbore;

wherein the transducer holder includes a throughbore extending axially between the first counterbore and the second counterbore;

wherein the piezoelectric capsule has a first end distal the transducer holder and a second end seated in the first counterbore of the transducer holder proximal the throughbore of the transducer holder; and wherein the transformer capsule is seated in the second counterbore of the transducer holder and includes a first end proximal the throughbore of the transducer holder and a second end distal the throughbore of the transducer holder.

3. The flow meter of claim 2 further comprising a coupling disposed in the throughbore of the transducer holder, wherein the coupling has a first end connected to the second end of the piezoelectric capsule and a second end connected to the first end of the transformer capsule, wherein the coupling electrically couples the piezoelectric element and the transformer.

4. The flow meter of claim 3, wherein the first end and the second end of the coupling each comprise a coax connector;

wherein the second end of the piezoelectric capsule and the first end of the transformer capsule each comprise a coax connector that mates with one of the coax connectors of the coupling.

5. The flow meter of claim 4, wherein each coax connector of the coupling is a male coax connector, the coax connector of the piezoelectric capsule is a female coax connector that engages the male coax connector of the first end of the coupling, and the coax connector of the transformer capsule is a female coax connector that engages the male coax connector of the second end of the coupling.

6. The flow meter of claim 4, wherein the piezoelectric capsule comprises a radially outer piezoelectric housing including a counterbore extending axially from the second end of the piezoelectric capsule; and wherein the coax connector of the piezoelectric capsule is surface mounted to a circuit board disposed in the counterbore of the piezoelectric housing.

7. The flow meter of claim 6, wherein the transformer capsule includes a radially outer transformer housing;

wherein the transformer housing includes a through bore extending from the first end to the second end of the transformer capsule;

wherein coax connector of the transformer capsule is surface mounted to a circuit board disposed in the throughbore of the transformer housing.

8. The flow meter of claim 6, wherein the annular seal is a glass seal.

9. The flow meter of claim 4 further comprising an annular seal between the coupling and the transducer holder.

10. The flow meter of claim 2 further comprising an annular seal assembly radially disposed between the transducer holder and the piezoelectric capsule.

11. The flow meter of claim 10 further comprising at least one annular seal assembly radially disposed between the transducer holder and the spool piece.

12. An ultrasonic flow meter for measuring the flow of a fluid through a pipeline, comprising:

a spool piece including a throughbore and a plurality of transducer ports extending from the outer surface of the spool piece to the throughbore;

a transducer assembly disposed in one of the transducer ports, wherein the transducer assembly has a central axis and comprises:

a piezoelectric capsule having a first end proximal the throughbore of the spool piece and a second end distal the throughbore of the spool piece, and comprising a piezoelectric housing extending between the first end and the second end;

wherein the piezoelectric housing includes a first counterbore extending axially from the first end, and wherein the piezoelectric capsule includes a piezoelectric element disposed in the first counterbore proximal the first end; and a transformer capsule coupled to the piezoelectric capsule, wherein the transformer capsule comprises a transformer housing and a transformer disposed within the transformer housing;

an annular seal assembly radially disposed between the transducer assembly and the spool piece, and axially disposed between the transformer capsule and the throughbore of the spool piece, wherein the seal assembly restrict the flow of fluid through the transducer port between the throughbore of the spool piece and the transformer capsule.

13. The flow meter of claim 12, wherein the piezoelectric housing comprises a second counterbore extending axially from the second end, and at least one throughbore extending between the first counterbore and the second counterbore;

wherein the transformer capsule is disposed in the second counterbore of the piezoelectric capsule and has a first end proximal the at least one throughbore of the piezoelectric housing, a second end distal the throughbore of the piezoelectric housing; and wherein the transducer assembly further comprises a coupling disposed in each throughbore of the piezoelectric housing, wherein each coupling has a first end electrically coupled to the piezoelectric element and a second end electrically coupled to the transformer.

14. The flow meter of claim 13 further comprising an annular seal disposed between each coupling and the piezoelectric housing.

15. The flow meter of claim 14, wherein each annular seal between each coupling and the piezoelectric housing is a glass seal.

16. The flow meter of claim 14, wherein each coupling comprises a pin connector extending between a mating socket in the first counterbore and a mating socket in the transformer capsule.

17. The flow meter of claim 14, wherein the transducer port includes internal threads and the piezoelectric housing includes external threads that engage the internal threads of the transducer port.

18. The flow meter of claim 17, wherein the second counterbore includes internal threads and the transformer housing includes external threads that engage the internal threads of the second counterbore.

19. The flow meter of claim 12, wherein the at least one seal assembly is radially disposed between the piezoelectric housing and the spool piece.

20. The flow meter of claim 12 further comprising a transducer holder having a first end proximal the throughbore of the spool piece, and a second end distal the throughbore of the spool piece;

wherein the piezoelectric capsule is coupled to the transducer holder and extends generally axially from the first end of the transducer holder;

wherein the transformer capsule is coupled to the transducer holder and is axially spaced apart from the piezoelectric capsule.

21. The flow meter of claim 20, wherein the at least one seal assembly is radially disposed between the transducer holder and the spool piece.

22. The flow meter of claim 20, wherein the first end of the transducer holder includes a first axial counterbore and the second end of the transducer holder includes a second axial counterbore;
- wherein the transducer holder includes a throughbore extending axially between the first counterbore and the second counterbore of the transducer holder;
- wherein the second end of the piezoelectric capsule is seated in the first counterbore of the transducer holder proximal the throughbore of the transducer holder; and
- wherein the transformer capsule is seated in the second counterbore of the transducer holder and includes a first end proximal the throughbore of the transducer holder and a second end distal the throughbore of the transducer holder.

23. The flow meter of claim 22 further comprising a coupling disposed in the throughbore of the transducer holder, wherein the coupling has a first end connected to the second end of the piezoelectric capsule and a second end connected to the first end of the transformer capsule, wherein the coupling electrically couples the piezoelectric element and the transformer.

24. The flow meter of claim 23 further comprising an annular glass seal disposed between the coupling and the transducer holder.

25. The flow meter of claim 24 further comprising an annular seal assembly radially disposed between the transducer holder and the piezoelectric capsule.

26. The flow meter of claim 23, wherein the first end and the second end of the coupling each comprise a coax connector;
- wherein the second end of the piezoelectric capsule and the first end of the transformer capsule each comprise a coax connector that mates with one of the coax connectors of the coupling.

* * * * *